United States Patent
Isogai et al.

(10) Patent No.: US 8,682,085 B2
(45) Date of Patent: Mar. 25, 2014

(54) REPRESENTATIVE IMAGE DISPLAY DEVICE AND REPRESENTATIVE IMAGE SELECTION METHOD

(75) Inventors: Kuniaki Isogai, Osaka (JP); Takashi Kawamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 848 days.

(21) Appl. No.: 12/743,284

(22) PCT Filed: Sep. 10, 2009

(86) PCT No.: PCT/JP2009/004468
§ 371 (c)(1),
(2), (4) Date: May 17, 2010

(87) PCT Pub. No.: WO2010/041377
PCT Pub. Date: Apr. 15, 2010

(65) Prior Publication Data
US 2010/0271395 A1 Oct. 28, 2010

(30) Foreign Application Priority Data
Oct. 6, 2008 (JP) .................................. 2008-259237

(51) Int. Cl.
*G06K 9/62* (2006.01)
*G06F 7/00* (2006.01)
*G06K 9/00* (2006.01)

(52) U.S. Cl.
USPC ............................ 382/225; 707/737; 382/118

(58) Field of Classification Search
USPC .................... 382/225, 118; 707/737
See application file for complete search history.

(56) References Cited

U.S. PATENT DOCUMENTS

| 6,449,612 | B1 * | 9/2002 | Bradley et al. | 1/1 |
| 7,869,658 | B2 * | 1/2011 | Blose et al. | 382/224 |
| 2004/0073543 | A1 * | 4/2004 | Kim et al. | 707/3 |
| 2004/0090472 | A1 * | 5/2004 | Risch et al. | 345/853 |
| 2007/0174790 | A1 * | 7/2007 | Jing et al. | 715/838 |
| 2007/0271297 | A1 * | 11/2007 | Jaffe et al. | 707/104.1 |
| 2008/0089593 | A1 * | 4/2008 | Ohwa | 382/225 |
| 2008/0118160 | A1 * | 5/2008 | Fan et al. | 382/225 |

(Continued)

FOREIGN PATENT DOCUMENTS

| CN | 101150662 | 3/2008 |
| CN | 101243448 | 8/2008 |
| WO | 2008/103412 | 8/2008 |

OTHER PUBLICATIONS

Chinese Office Action dated Sep. 17, 2012 in corresponding Chinese Patent Application No. 200980101252.0.

(Continued)

*Primary Examiner* — Kathleen Y Dulaney
(74) *Attorney, Agent, or Firm* — Wenderoth, Lind & Ponack, L.L.P.

(57) ABSTRACT

A person cluster selection part selects one or more person clusters as representative person clusters in order of largest number of facial images included therein. A unit selection part selects, from each representative person cluster, (i) a unit having the highest likelihood as a first representative unit, and (ii) units in order of lowest likelihood as a second representative unit onward. A representative facial image selection part selects, from each representative unit, (i) a facial image having the highest likelihood as a first representative facial image, and (ii) facial images in order of lowest likelihood as a second representative facial image onward.

9 Claims, 23 Drawing Sheets

(56) References Cited

U.S. PATENT DOCUMENTS

2008/0133573 A1* 6/2008 Haft et al. .................... 707/102
2009/0257649 A1* 10/2009 Yamauchi et al. ............ 382/165
2009/0290812 A1* 11/2009 Naaman et al. ............... 382/305

OTHER PUBLICATIONS

Gomi Ai et al., "CAT GUI for browsing a large number of images and controlling the level of details thereof", together with English translation thereof.

Chinese Office Action issued Sep. 17, 2012 in Chinese Patent Application No. 200980101252.0.

International Search Report issued Dec. 1, 2009 in International (PCT) Application No. PCT/JP2009/004468.

Gomi, A. et al., *CAT: A Hierarchical Image Browser Using a Rectangle Packing Technique*, Proceedings of $12^{th}$ International Conference on Information Visualisation, IEEE (Jul. 2008), pp. 82-87 (including English translation).

Cui, J. et al., *EasyAlbum: An Interactive Photo Annotation System Based on Face Clustering and Re-ranking*, CHI 2007 Proceedings (Apr. 28-May 3, 2007), pp. 367-376.

* cited by examiner

FIG. 2

| Image ID | Imaging time | Image file name |
|---|---|---|
| 0 | 2008/07/29 15:45:00 | 001/P0001.jpg |
| 1 | 2008/07/29 15:50:30 | 001/P0002.jpg |
| 2 | 2008/07/29 15:51:00 | 001/P0003.jpg |
| ⋮ | ⋮ | ⋮ |

FIG. 3

| Face ID | Image ID | Facial image file name | Facial feature amount file name |
|---|---|---|---|
| 0 | 0 | 001/face/0.bmp | 001/feature/0.dat |
| 1 | 1 | 001/face/1.bmp | 001/feature/1.dat |
| 2 | 1 | 001/face/2.bmp | 001/feature/2.dat |
| 3 | 2 | 001/face/3.bmp | 001/feature/3.dat |
| 4 | 2 | 001/face/4.bmp | 001/feature/4.dat |
| ⋮ | ⋮ | ⋮ | ⋮ |

FIG. 4

| Face ID | Image ID | Person ID | Unit ID | Operator information | Grouping time information |
|---|---|---|---|---|---|
| 0 | 0 | 0 | 0 | System | 2008/07/30 00:00:10 |
| 1 | 1 | 1 | 2 | System | 2008/07/30 00:00:15 |
| 2 | 1 | 2 | 3 | User | 2008/07/30 12:05:26 |
| 3 | 2 | 0 | 1 | System | 2008/07/30 00:00:20 |
| 4 | 2 | 2 | 3 | User | 2008/07/30 12:05:26 |
| ... | ... | ... | ... | ... | ... |

FIG. 16

| Face ID | Image ID | Person ID | Operator information | Grouping time information |
|---|---|---|---|---|
| 0 | 0 | 0 | System | 2008/07/30 00:00:10 |
| 1 | 1 | 1 | System | 2008/07/30 00:00:15 |
| 2 | 1 | 2 | User | 2008/07/30 12:05:26 |
| 3 | 2 | 0 | System | 2008/07/30 00:00:20 |
| 4 | 2 | 2 | User | 2008/07/30 12:05:26 |
| ... | ... | ... | ... | ... |

FIG. 20
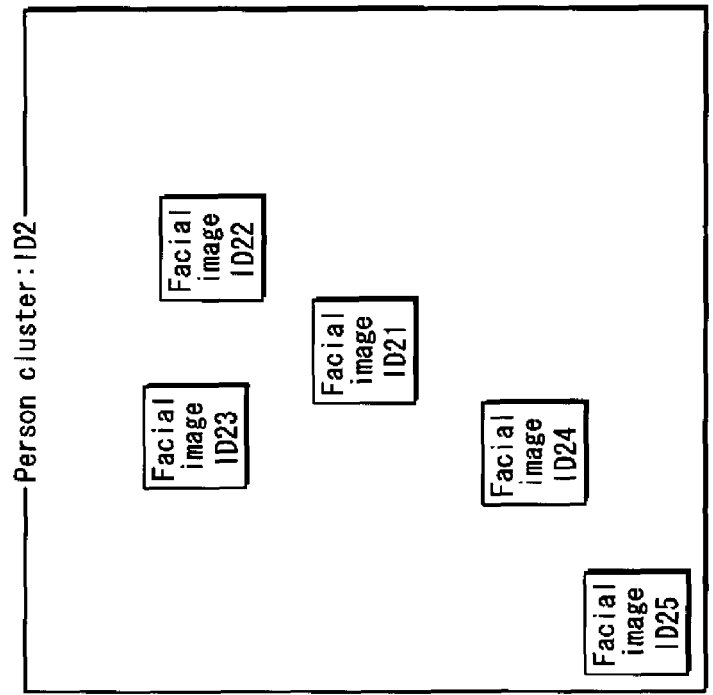
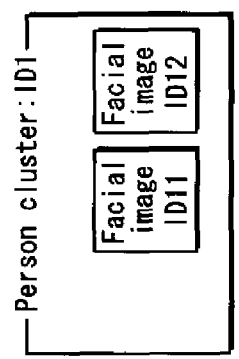

REPRESENTATIVE IMAGE DISPLAY DEVICE AND REPRESENTATIVE IMAGE SELECTION METHOD

BACKGROUND of the INVENTION

TECHNICAL FIELD

The present invention relates to technology for grouping images captured by a digital still camera, a digital video camera, etc., and displaying the grouped images.

BACKGROUND ART

There are conventional methods of grouping images and displaying the grouped images. One of such conventional methods makes use of people shown in the images and groups similar faces into one cluster with the aid of a facial image recognition technique, so that clusters of images showing the same person are displayed cluster-by-cluster.

For the purpose of improving accuracy of facial image clustering, another one of such conventional methods facilitates grouping of people by providing an operation interface (hereinafter, "operation IF") that enables a user to correct a clustering result (for example, see Non-Patent Literature 1). According to this method, the result of the facial image clustering can be corrected by the user manually editing (annotating) the result of the facial image clustering. For example, assume a case where facial images of different people are grouped into one cluster. This situation where facial images of different people coexist in the same cluster can be resolved by the user, to his/her discretion, dividing this cluster into clusters that each include an image (s) of the same individual. In contrast, assume a case where facial images of a single person are grouped into a plurality of clusters. This situation where facial images of a single person are grouped into a plurality of clusters can be resolved by combining the plurality of clusters into one cluster.

CITATION LIST

Non-Patent Literature

[Non-Patent Literature 1]
Jingyu Cui, Fang Wen, Rong Xiao, Yuandong Tiam, and Xiaoou Tang. 2007. EasyAlbum: An Interactive Photo Annotation System Based on Face Clustering and Re-ranking. *CHI 2007 Proceedings:* 367-376.

SUMMARY OF INVENTION

Normally, when performing the annotation, part of facial images in each cluster is displayed as a representative facial image(s). Despite this fact, none of the above-described conventional techniques takes into consideration how such a representative facial image to be displayed is selected. Hence, the above-described conventional techniques give rise to the problem that, because facial images that the user need to correct are not displayed, the user cannot perform efficient annotation on the result of facial image clustering. The same problem occurs in a case where the user performs annotation on the result of clustering of images other than facial images.

In view of the above, the present invention aims to provide a representative image display device and a representative image selection method that enable a user to perform efficient annotation on a result of image grouping.

The above aim can be achieved by a representative image display device that selects representative images according to grouping results of a plurality of images and sub-clusters and displays the selected representative images on a display, the images being grouped into the sub-clusters such that each sub-cluster includes similar images, the sub-clusters being grouped into a plurality of clusters such that each cluster includes similar sub-clusters, the representative image display device comprising: a cluster selection unit operable to select one or more of the clusters as representative clusters; a sub-cluster selection unit operable to select, from each representative cluster, M sub-clusters as representative sub-clusters based on first likelihoods of the sub-clusters in the representative cluster, each first likelihood indicating accuracy of the grouping result of the corresponding sub-cluster (M is an integer satisfying a relationship $1 \leq M \leq$ the number of the sub-clusters in the representative cluster); and a representative image selection unit operable to select, from each representative sub-cluster, N images as representative images based on second likelihoods of the images in the representative sub-cluster, each second likelihood indicating accuracy of the grouping result of the corresponding image (N is an integer satisfying a relationship $1 \leq N \leq$ the number of the images in the representative sub-cluster).

The above aim can also be achieved by a representative image display method for selecting representative images according to grouping results of a plurality of images and sub-clusters and displaying the selected representative images, the images being grouped into the sub-clusters such that each sub-cluster includes similar images, the sub-clusters being grouped into a plurality of clusters such that each cluster includes similar sub-clusters, the representative image display method comprising the steps of: selecting one or more of the clusters as representative clusters; selecting, from each representative cluster, M sub-clusters as representative sub-clusters based on first likelihoods of the sub-clusters in the representative cluster, each first likelihood indicating accuracy of the grouping result of the corresponding sub-cluster (M is an integer satisfying a relationship $1 \leq M \leq$ the number of the sub-clusters in the representative cluster); and selecting, from each representative sub-cluster, N images as representative images based on second likelihoods of the images in the representative sub-cluster, each second likelihood indicating accuracy of the grouping result of the corresponding image (N is an integer satisfying a relationship $1 \leq N \leq$ the number of the images in the representative sub-cluster).

The above representative image display device and representative image display method select and display representative images by using (i) the first likelihoods that each indicate accuracy of the grouping result of the corresponding sub-cluster and (ii) the second likelihoods that each indicate accuracy of the grouping result of the corresponding image. Accordingly, compared to a case where representative images are randomly selected and displayed, the above representative image display device and representative image display method enable a user to perform efficient annotation with respect to the grouping results.

The above representative image display device may be structured so that the sub-cluster selection unit (i) selects, from each representative cluster, the sub-cluster having the highest first likelihood in the representative cluster as a first representative sub-cluster, and (ii) when M is greater than or equal to 2, further selects, from each representative cluster, (M−1) sub-clusters as second to $M^{th}$ representative sub-clusters in order of lowest first likelihood.

The above structure allows the user to perform annotation with respect to the grouping results while looking at images in a sub-cluster having high likelihood, in some cases in combination with images in a sub-cluster having low likelihood. Thus, with the above structure, the user can perform efficient annotation, such as separating a sub-cluster that has been inaccurately grouped into a certain cluster from the certain cluster.

The above representative image display device may be structured so that the sub-cluster selection unit uses, as the first likelihood of each sub-cluster, a distance between (i) a central position or a center of mass of a feature space of the corresponding representative cluster and (ii) a central position or a center of mass of a feature space of the sub-cluster.

The above representative image display device may be structured so that (i) when selecting the first representative sub-cluster, the sub-cluster selection unit uses, as the first likelihood of each sub-cluster, a distance between (a) a central position or a center of mass of a feature space of the corresponding representative cluster and (b) a central position or a center of mass of a feature space of the sub-cluster, and (ii) when selecting the second to $M^{th}$ representative sub-clusters, the sub-cluster selection unit uses, as the first likelihood of each sub-cluster, information showing whether the grouping result of the sub-cluster has been corrected by a user.

The above representative image display device may be structured so that (i) when selecting the first representative sub-cluster, the sub-cluster selection unit uses, as the first likelihood of each sub-cluster, a distance between (a) a central position or a center of mass of a feature space of the corresponding representative cluster and (b) a central position or a center of mass of a feature space of the sub-cluster, and (ii) when selecting the second to $M^{th}$ representative sub-clusters, the sub-cluster selection unit uses, as the first likelihood of each sub-cluster, the number of the images in the sub-cluster.

The above structures allow selecting proper sub-clusters.

The above representative image display device may be structured so that the representative image selection unit (i) selects, from each representative sub-cluster, the image having the highest second likelihood in the representative sub-cluster as a first representative image, and (ii) when N is greater than or equal to 2, further selects, from each representative sub-cluster, (N−1) images as second to $N^{th}$ representative images in order of lowest second likelihood.

The above structure allows the user to perform annotation with respect to the grouping results while looking at images having high likelihood, in some cases in combination with images having low likelihood. Thus, with the above structure, the user can perform efficient annotation, such as separating an image that has been inaccurately grouped into a certain sub-cluster from the certain sub-cluster.

The above representative image display device may be structured so that the representative image selection unit uses, as the second likelihood of each image, a distance between (i) a central position or a center of mass of a feature space of the corresponding representative sub-cluster and (ii) a position in a feature space of the image.

The above representative image display device may be structured so that (i) when selecting the first representative image, the representative image selection unit uses, as the second likelihood of each image, a distance between (a) a central position or a center of mass of a feature space of the corresponding representative sub-cluster and (b) a position in a feature space of the image, and (ii) when selecting the second to $N^{th}$ representative images, the representative image selection unit uses, as the second likelihood of each image, information showing whether the grouping result of the image has been corrected by a user.

The above structures allow selecting proper images.

The above representative image display device may further comprise a display layout control unit operable to display the first representative image by using a display method that is different from a display method used for the second to $N^{th}$ representative images.

The above structure enables the user to distinguish an image having high likelihood from an image having low likelihood in one glance.

The above representative image display device may further comprise a number determination unit operable to determine the number of representative images to be displayed on the display, according to a size of a display area of the display and an image size that can be visually recognized by a user.

The above structure enables the user to perform annotation with respect to the grouping results while looking at multiple pictures that are each displayed in an image size that can be visually recognized by the user. Thus, with the above structure, the user can perform efficient annotation.

With regard to the above representative image display device, each image may be a facial image of a human being.

In the above case, the user can perform efficient annotation with respect to grouping results of facial images of human beings, which is highly demanded in the field of facial recognition.

The above aim can also be achieved by a representative image display device that selects representative images according to grouping results of a plurality of images and displays the selected representative images on a display, the images being grouped into a plurality of clusters such that each cluster includes similar images, the representative image display device comprising: a cluster selection unit operable to select one or more of the clusters as representative clusters; and a representative image selection unit operable to select, from each representative cluster, N images as representative images based on likelihoods of the images in the representative cluster, each likelihood indicating accuracy of the grouping result of the corresponding image (N is an integer satisfying a relationship 1≤N≤the number of the images in the representative cluster).

The above aim can also be achieved by a representative image display method for selecting representative images according to grouping results of a plurality of images and displaying the selected representative images, the images being grouped into a plurality of clusters such that each cluster includes similar images, the representative image display method comprising the steps of: selecting one or more of the clusters as representative clusters; and selecting, from each representative cluster, N images as representative images based on likelihoods of the images in the representative cluster, each likelihood indicating accuracy of the grouping result of the corresponding image (N is an integer satisfying a relationship 1≤N≤the number of the images in the representative cluster).

The above representative image display device and representative image display method select and display representative images by using the likelihoods that each indicate accuracy of the grouping result of the corresponding image. Accordingly, compared to a case where representative images are randomly selected and displayed, the above representative image display device and representative image display method enable the user to perform efficient annotation with respect to the grouping results.

The above representative image display device may be structured so that the representative image selection unit (i) selects, from each representative cluster, the image having the highest likelihood in the representative cluster as a first representative image, and (ii) when N is greater than or equal to 2, further selects, from each representative cluster, (N−1) images as second to $N^{th}$ representative images in order of lowest likelihood.

The above structure allows the user to perform annotation with respect to the grouping results while looking at images having high likelihood, in some cases in combination with images having low likelihood. Thus, with the above structure, the user can perform efficient annotation, such as separating an image that has been inaccurately grouped into a certain cluster from the certain cluster.

BRIEF DESCRIPTION OF DRAWINGS

FIG. 2 shows one example of an image database (image DB) shown in FIG. 1.

FIG. 3 shows one example of a facial image database (facial image DB) shown in FIG. 1.

FIG. 4 shows one example of a facial image cluster database (facial image cluster DB) shown in FIG. 1.

FIG. 16 shows one example of a facial image cluster database (facial image cluster DB) shown in FIG. 15.

FIG. 20 schematically shows a result of facial image grouping in a feature space, in order to illustrate one example of processing performed by the representative image display device shown in FIG. 15.

DETAILED DESCRIPTION OF INVENTION

[First Embodiment]

A description is now given of the first embodiment of the present invention with reference to the accompanying drawings.

<Device Structure>

Figure 1:
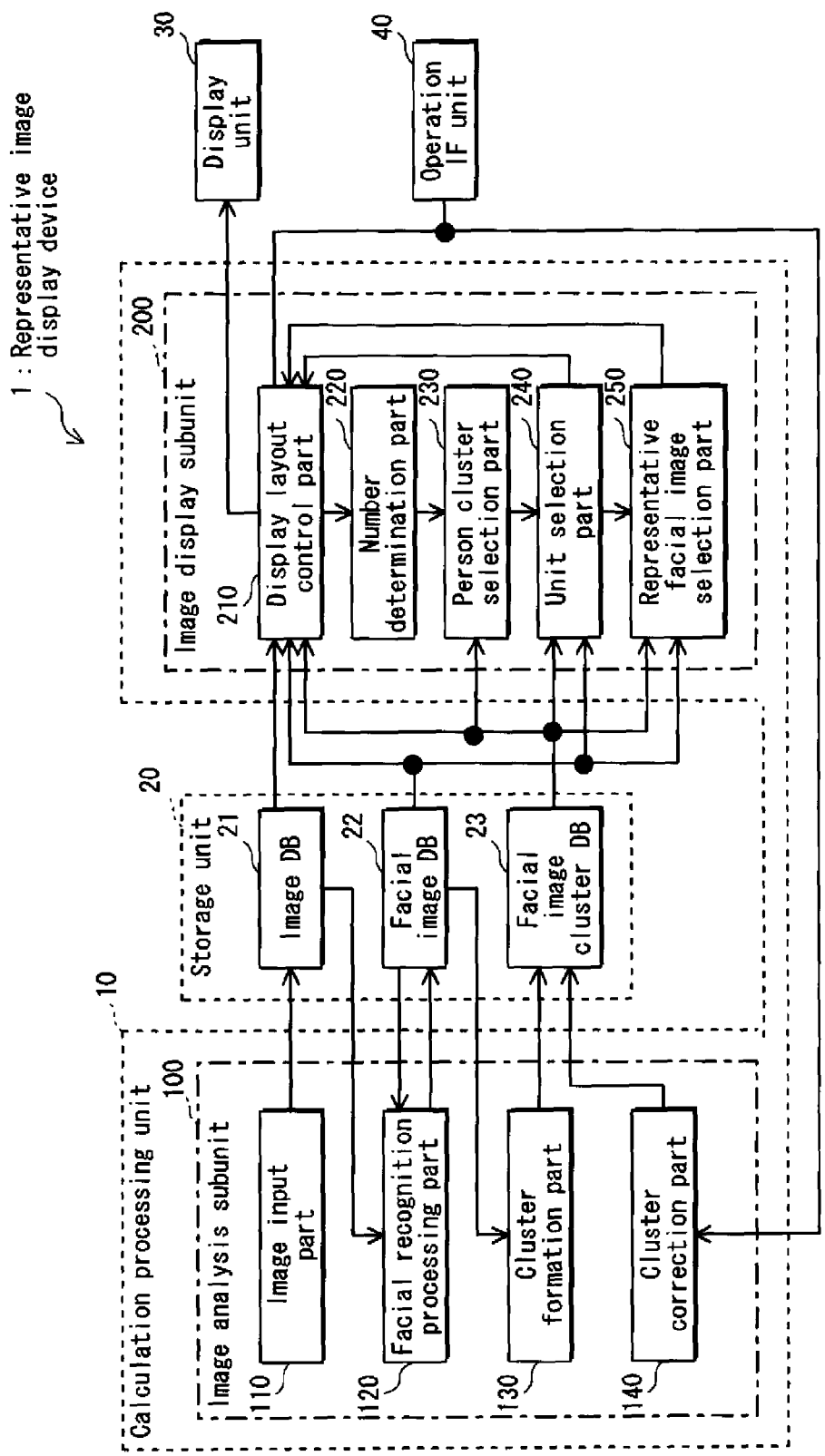
FIG. 1 shows an overall structure of a representative image display device pertaining to the first embodiment.

FIG. 1 shows an overall structure of a representative image display device 1 pertaining to the present embodiment. The representative image display device 1 is composed of a calculation processing unit 10, a storage unit 20, a display unit 30 and an operation interface unit (hereinafter, "operation IF unit") 40.

The calculation processing unit 10 is constituted from a central processing unit (CPU) and the like, and performs various types of controls and calculations for the entirety of the representative image display device 1.

The storage unit 20 is constituted from a read only memory (ROM), a random access memory (RAM), a hard disk drive (HDD), or the like, and stores therein various types of control programs for controlling the representative image display device 1, various types of application programs, etc. The storage unit 20 also stores therein programs in which procedures indicating the operational flows of FIGS. 5 to 8 are written. The storage unit 20 also stores therein image data, facial image data, facial feature amount data, an image database (hereinafter, "image DB") 21, a facial image database (hereinafter, "facial image DB") 22, and a facial image cluster database (hereinafter, "facial image cluster DB") 23.

The display unit 30 is a display device including a liquid crystal display, a plasma display, or the like.

The operation IF unit 40 receives user operations via a mouse, a touchscreen, etc.

(Structures of Databases in Storage Unit)

The following describes the image DB 21, the facial image DB 22 and the facial image cluster DB 23 stored in the storage unit 20, in listed order.

Structure of Image DB

FIG. 2 shows one example of the image DB 21 illustrated in FIG. 1. The image DB 21 is a database for storing, in correspondence with each image, (i) an ID that identifies the image (hereinafter, "image ID"), (ii) an imaging time when the image was captured, and (iii) an image file name assigned to image data of the image. Note, each image file name indicates the substance of the corresponding image data.

Structure of Facial Image DB

FIG. 3 shows one example of the facial image DB 22 illustrated in FIG. 1. The facial image DB 22 is a database for storing, in correspondence with each facial image, (i) an ID that identifies the facial image (hereinafter, "face ID"), (ii) an image ID of an image that includes the facial image, (iii) a facial image file name assigned to facial image data of the facial image, and (iv) a facial feature amount file name assigned to facial feature amount data calculated from the facial image data of the facial image.

Note, each facial image file name indicates the substance of the corresponding facial image data, and each facial feature amount file name indicates the substance of the corresponding facial feature amount data. Although the present invention is described under the assumption that each facial image data is stored in bitmap format, each facial image data may be stored in another data format. Specifics of the facial image data and the facial feature amount data will be described later.

Structure of Facial Image Cluster DB

FIG. 4 shows one example of the facial image cluster DB 23 illustrated in FIG. 1. The facial image cluster DB 23 is a database for storing, in correspondence with each facial image, (i) a face ID of the facial image, (ii) an image ID of an image that includes the facial image, (iii) an ID that identifies a person cluster to which the facial image belongs (hereinafter, "person ID"), (iv) an ID that identifies a unit to which the facial image belongs (hereinafter, "unit ID"), (v) operator information showing by whom/what the grouping of the facial image was performed, and (vi) grouping time information showing the time when the grouping of the facial image was performed. Note, each person cluster contains one or more facial images of the same person. Among all the facial images contained in one person cluster, facial images that are especially similar to one another are grouped into a single unit (in this sense, a unit can be considered as a cluster). Methods for forming person clusters and units will be discussed later. "Units" and "person clusters" of the present embodiment are equivalent to "sub-clusters" and "clusters", respectively.

Each operator information shows whether the corresponding facial image is (i) a facial image that has been automatically grouped by a cluster formation part 130 (described later), or (ii) a facial image whose grouping has been corrected by a cluster correction part 140 (described later) in accordance with the annotation provided by the user. Each operator information shows "System" in the former case, and "User" in the latter case. Each grouping time information shows (i) the time when the corresponding facial image is automatically grouped, or (ii) in a case where the grouping of the corresponding facial image is corrected, the time when the correction is made.

Below, a set of pieces of information for one record of the facial image cluster DB 23 may be referred to as a "facial image cluster information set".

(Structure of Calculation Processing Unit)

The calculation processing unit 10 reads out, from the storage unit 20, the programs in which the procedures indicating the operational flows of FIGS. 5 to 8 are written, and executes the read programs. By thus executing the read programs, the calculation processing unit 10 functions as an image analysis subunit 100 and an image display subunit 200.

(Functions and Structure of Image Analysis Subunit)

As shown in FIG. 1, the image analysis subunit 100 includes an image input part 110, a facial recognition processing part 120, the cluster formation part 130 and the cluster correction part 140.

The image input part 110 reads in image data of an image captured by an imaging device, such as a digital still camera and a digital video camera. The image input part 110 assigns a unique image ID to the image, and stores the following into the image DB 21 in one-to-one correspondence: (i) the image ID; (ii) the imaging time when the image was captured; and (iii) the image file name assigned to the image data of the image. The image input part 110 stores the read image data into the storage unit 20 as well.

Each imaging time information is date/time information showing the date and time of capturing of the corresponding image. The date/time information is recorded by an imaging device, such as a digital still camera and a digital video camera, upon capturing the corresponding image. The image input part 110 reads out the date/time information, which is stored in the corresponding image file as exchangeable image file format (EXIF) information, as the imaging time information.

When the imaging device is directly connected via a cable to, for example, a universal serial bus (USB) connector built in the representative image display device 1, the image input part 110 may read in image data from a recording medium loaded in the imaging device. Alternatively, the image input part 110 may read in image data from a recording medium, such as a secure digital (SD) memory card, loaded in the representative image display device 1.

Image data may have been compressed/encoded in commonly-used joint photographic experts group (JPEG) format, have been compressed/encoded in moving picture format, such as moving picture experts group, phase 4 (MPEG-4).

The facial recognition processing part 120 refers to the image DB 21 and reads out, in correspondence with each image ID, the image data assigned the image file name corresponding to the image ID, from the storage unit 20. Then, the facial recognition processing part 120 performs image recognition processing on the read image data to detect a facial area of a person shown in the image. When the facial recognition processing part 120 detects one or more facial areas, the facial recognition processing part 120 generates, in correspondence with each of the detected facial areas, facial image data related to the facial image in the detected facial area. Thereafter, the facial recognition processing part 120 assigns a unique face ID to each of the facial images in the detected facial areas, and stores the following into the facial image DB 22 in correspondence with each facial image: the face ID; the image ID of the image including the facial image; and the facial image file name assigned to the facial image data of the facial image. The facial recognition processing part 120 stores each facial image data into the storage unit 20 as well.

Next, the facial recognition processing part 120 refers to the facial image DB 22 and reads out, in correspondence with each face ID, the facial image data assigned the facial image file name corresponding to the face ID, from the storage unit 20. Then, the facial recognition processing part 120 generates, from each facial image data that has been read out, facial feature amount data related to the corresponding facial image, the facial feature amount data being written using feature amount vectors. Thereafter, the facial recognition processing part 120 stores, in correspondence with each face ID, the facial feature amount file name assigned to the facial feature amount data of the corresponding facial image, into the facial image DB 22. The facial recognition processing part 120 stores each facial feature amount data into the storage unit 20 as well.

Note, although there is a case where a plurality of face IDs correspond to one image ID, one face ID never corresponds to a plurality of image IDs.

Note, the facial recognition processing part 120 detects facial areas by performing, for example, commonly-known image processing (outline extraction processing, color distribution analysis processing, etc.) on each image data. With use of a part of each image data corresponding to a facial area, the facial recognition processing part 120 generates facial image data of a facial image in the facial area. Also, the facial recognition processing part 120 generates facial feature amount data of a facial image corresponding to facial image data, by converting the facial image data into data showing feature amount vectors with use of a Gabor filter or the like.

The cluster formation part 130 refers to the facial image DB 22 and reads out, from the storage unit 20, the facial feature amount data assigned the facial feature amount file name corresponding to each face ID. By using each facial feature amount data that has been read out, the cluster formation part 130 groups similar facial images together, forms one or more units by including each group of similar facial images in a different one of the units, and assigns a unique unit ID to each unit formed. Thereafter, the cluster formation part 130 calculates a degree of similarity with respect to each unit, forms one or more person clusters by including a group of similar units in each person cluster, and assigns a unique person ID to each person cluster formed.

The cluster formation part 130 stores the following into the facial image cluster DB 23 in correspondence with each facial image: the face ID of the facial image; the image ID of the image that includes the facial image; the person ID of the person cluster to which the facial image belongs; the unit ID of the unit to which the facial image belongs; the operator information of the facial image; and the grouping time information of the facial image. At this time, each operator information shows "System", and each grouping time information shows the time when the corresponding facial image was automatically grouped.

The cluster formation part 130 forms the units in the following manner. The cluster formation part 130 compares pieces of facial feature amount data read out from the storage unit 20 with one another. Assuming that facial images are similar to one another when differences between pieces of facial feature amount data thereof are smaller than or equal to a first threshold, the cluster formation part 130 groups these similar facial images into one unit.

The cluster formation part 130 forms the person clusters in the following manner. The cluster formation part 130 selects, from each of the formed units, a facial image whose facial feature amount data is closest to the central position or the center of mass of a feature space of the unit. Then, the cluster formation part 130 compares the pieces of facial feature amount data of the facial images selected from the units with one another. Assuming that units are similar to one another when differences between pieces of facial feature amount data thereof are smaller than or equal to a second threshold, the cluster formation part 130 groups these similar units into one person cluster.

Note, the first threshold and the second threshold are preset so that, for instance, the first threshold is smaller than the second threshold. Units and person clusters are not limited to being formed using the methods described above.

The cluster correction part 140 receives a user operation via the operation IF unit 40. In accordance with the received user operation, the cluster correction part 140 corrects the facial image cluster information set that is stored in the facial image cluster DB 23 and corresponds to the facial image whose grouping result has been corrected by the user. As a result, the operator information and the grouping time information in the corrected facial image cluster information set show "User" and the time when the above grouping correction was performed, respectively.

(Functions and Structure of Image Display Subunit)

As shown in FIG. 1, the image display subunit 200 includes a display layout control part 210, a number determination part 220, a person cluster selection part 230, a unit selection part 240, and a representative facial image selection part 250.

The display layout control part 210 refers to contents stored in the image DB 21, the facial image DB 22 and the facial image cluster DB 23, and controls a display layout of facial images to be displayed on the display unit 30. In controlling the display layout, the display layout control part 210 uses pieces of information input from the unit selection part 240, the representative facial image selection part 250 and the operation IF unit 40.

When the display layout control part 210 requests the number determination part 220 to determine a displayed facial image number, which is the number of facial images to be displayed on the display unit 30 (hereinafter, "representative facial images"), the number determination part 220 determines the displayed facial image number and outputs the determined displayed facial image number to the person cluster selection part 230.

In the present embodiment, the number determination part 220 first acquires a display area size of the display unit 30. The number determination part 220 then determines (i) a display size of each facial image to be displayed on the display unit 30, so that each facial image can be visually recognized by the user without fail, and (ii) the displayed facial image number based on the display area size of the display unit 30 and the display size of each facial image. In a case where the display 30 has a fixed display area size, the larger the display size of each facial image, the smaller the displayed facial image number; in other words, the smaller the display size of each facial image, the larger the displayed facial image number.

The person cluster selection part 230 refers to the facial image cluster DB 23 and acquires the number of person IDs, namely, the number of person clusters. In a case where the displayed facial image number is smaller than the acquired number of person clusters, the person cluster selection part 230 determines a representative person cluster number, which is the number of person clusters from which representative facial images should be displayed (hereinafter, "representative person clusters"), to be the same as the displayed facial image number. In a case where the displayed facial image number is greater than or equal to the acquired number of person clusters, the person cluster selection part 230 determines the representative person cluster number to be the same as the acquired number of person clusters. In the former case, part of the person clusters becomes representative person clusters. In the latter case, all of the person clusters become representative person clusters.

Next, the person cluster selection part 230 refers to the facial image cluster DB 23, and selects a certain number of person clusters as representative person clusters in order of largest number of facial images included therein, the certain number being the same as the representative person cluster number. The person cluster selection part 230 also determines a person cluster facial image number, which is the number of representative facial images to be displayed from a representative person cluster, so that each representative person cluster has a similar person cluster facial image number. Then, the person cluster selection part 230 outputs, to the unit selection part 240, the person ID of each representative person cluster and the corresponding person cluster facial image number.

Until the number of representative person clusters selected becomes equal to the value of a remainder obtained by dividing the displayed facial image number by the number of person clusters, the person cluster selection part 230 determines the person cluster facial image number of each of the representative person clusters selected to be a value obtained by adding one to a value of a quotient of the above division. After the number of representative person clusters selected has become equal to the value of said remainder, the person cluster selection part 230 determines the person cluster facial image number of each representative person cluster to be selected from that point onward to be the value of the quotient of the above division.

It is considered that a person cluster including a large number of facial images has a higher possibility of including inaccurate facial images than a person cluster including a small number of facial images. Thus, selecting representative person clusters in accordance with the number of facial images included in each person cluster increases the possibility that the person cluster selection part 230 will select, as a representative person cluster, a person cluster that has a high possibility of including inaccurate facial images.

With respect to each person cluster (representative person cluster) whose person ID has been input from the person cluster selection part 230, the unit selection part 240 (i) selects, from among all the units in the representative person cluster, one or more units from which representative facial images should be displayed (hereinafter, "representative units"), and (ii) determines the number of representative facial images to be displayed from each unit selected (hereinafter, "unit facial image number"), as follows.

The unit selection part 240 refers to the facial image cluster DB 23, and acquires the number of unit IDs, namely, the number of units, included in the representative person cluster. In a case where the person cluster facial image number of the representative person cluster, which is input from the person cluster selection part 230, is smaller than the acquired number of units, the unit selection part 240 determines a representative unit number, which is the number of representative units (i.e., units from which representative facial images should be displayed), to be the same as the person cluster facial image number. In a case where the person cluster facial image number is greater than or equal to the acquired number of units, the unit selection part 240 determines the representative unit number to be the same as the acquired number of units. In the former case, part of units in the representative person cluster becomes representative units. In the latter case, all of the units in the representative person cluster become representative units.

Next, the unit selection part 240 calculates, with respect to each unit in the representative person cluster, likelihood indicating accuracy of the result of grouping the unit. The unit selection part 240 selects, as a first representative unit, a unit having the highest likelihood in the representative person cluster. The unit selection part 240 selects, as a second representative unit onward, a certain number of units from the representative person cluster in order of lowest likelihood, the certain number being smaller than the representative unit number by one. The unit selection part 240 also determines a unit facial image number, which is the number of representative facial images to be displayed from a unit, so that each unit has a similar unit facial image number. Then, the unit selection part 240 outputs, to the representative facial image selection part 250, the unit ID of each representative unit and the corresponding unit facial image number. The unit selection part 240 also outputs, to the display layout control part 210, the unit ID of each representative unit and the order in which each representative unit is selected from the representative person cluster. This output information is used by the display layout control part 210 when displaying, from the representative person cluster, a representative unit having the highest likelihood by using a display method that is different from a display method used for other representative units. It goes without saying that when the representative unit number is "1", the selection of the second representative unit onward is not performed.

Until the number of representative units selected becomes equal to the value of a remainder obtained by dividing the person cluster facial image number by the number of units included in the selected representative person cluster, the unit selection part 240 determines the unit facial image number of each representative unit selected to be a value obtained by adding one to a quotient of the above division. After the number of representative units selected has become equal to the value of said remainder, the unit selection part 240 determines the unit facial image number of each representative unit to be selected from that point onward to be the value of the quotient of the above division.

Note, the unit selection part 240 uses one of the following (i) and (ii) as likelihood: (i) a distance between a central position of a feature space of the representative person cluster and a central position of a feature space of each unit; and (ii) a distance between a center of mass of the feature space of the representative person cluster and a center of mass of the feature space of each unit. The shorter the distance, the higher the likelihood of the unit. In other words, the longer the distance, the lower the likelihood of the unit. The unit selection part 240 (i) refers to the facial image cluster DB 23 and the facial image DB 22, (ii) calculates the central position or the center of mass of the representative person cluster, by using pieces of facial feature amount data of facial images in the representative person cluster, and (iii) calculates the central position or the center of mass of each unit in the representative person cluster, by using pieces of facial feature amount data of facial images in each unit. The unit selection part 240 selects, as a first representative unit, a unit whose central position or center of mass is closest to the central position or the center of mass of the representative person cluster. The unit selection part 240 selects, as a second representative unit onward, a certain number of units in order of longest distance between the central position or the center of mass of the unit and the central position or the center of mass of the representative person cluster, the certain number being smaller than the representative unit number by one.

According to the above structure, a unit whose central position or center of mass is closest to the central position or the center of mass of the representative person cluster has the highest possibility of being accurately grouped into the representative person cluster. On the other hand, the longer the distance between the central position or the center of mass of a unit and the central position or the center of mass of the representative person cluster, the higher the possibility of the unit being inaccurately grouped into the representative person cluster. Accordingly, the above structure allows the user to, for example, correct the grouping of facial images while looking at both (i) facial images in a representative unit that has a high possibility of being accurately grouped and (ii) facial images in a representative unit that has a high possibility of being inaccurately grouped. This makes it possible for the user to perform efficient annotation.

With respect to each unit (representative unit) whose unit ID has been input from the unit selection part 240, the representative facial image selection part 250 selects one or more representative facial images from among all the facial images included in the representative unit, as follows.

The representative facial image selection part 250 refers to the facial image cluster DB 23, and acquires the number of face IDs, namely, the number of facial images, included in the representative unit. In a case where the unit facial image number input from the unit selection part 240 is smaller than the acquired number of facial images, the representative facial image selection part 250 determines a representative facial image number, which is the number of representative facial images to be displayed from the representative unit, to be the same as the unit facial image number. In a case where the unit facial image number is greater than or equal to the acquired number of facial images, the representative facial image selection part 250 determines the representative facial image number to be the same as the acquired number of facial images. In the former case, part of the facial images included in the representative unit becomes representative facial images. In the latter case, all of the facial images included in the representative unit become representative facial images.

Next, the representative facial image selection part 250 calculates, with respect to each facial image included in the representative unit, likelihood indicating accuracy of the result of grouping the facial image. The representative facial image selection part 250 selects, as a first representative facial image, a facial image having the highest likelihood in the representative unit. The representative facial image selection part 250 selects, as a second representative facial image onward, a certain number of facial images from the representative unit in order of lowest likelihood, the certain number being smaller than the representative facial image number by one. Then, the representative facial image selection part 250 outputs, to the display layout control part 210, the face ID of each representative facial image and the order in which each representative facial image is selected from the representative unit. This output information is used by the display layout control part 210 when displaying, from the representative unit, a representative facial image having the highest likelihood by using a display method that is different from a display method used for other representative facial images. It goes without saying that when the representative facial image number is "1", the selection of the second representative facial image onward is not performed.

Note, the representative facial image selection part 250 uses one of the following (i) and (ii) as likelihood: (i) a distance between a central position of a feature space of the representative unit and a position in a feature space of each facial image; and (ii) a distance between a center of mass of the feature space of the representative unit and a position in the feature space of each facial image. The shorter the distance, the higher the likelihood of the facial image. In other words, the longer the distance, the lower the likelihood of the facial image. The representative facial image selection part 250 (i) refers to the facial image cluster DB 23 and the facial image DB 22, (ii) calculates the central position or the center of mass of the feature space of the representative unit, by using pieces of facial feature amount data of facial images in the representative unit, and (iii) calculates, for each facial image in the representative unit, a position in the feature space of the facial image by using the facial feature amount data of the facial image. The representative facial image selection part 250 selects, as a first representative facial image, a facial image whose position is closest to the central position or the center of mass of the representative unit. The representative facial image selection part 250 selects, as a second representative facial image onward, a certain number of facial images in order of longest distance between the position of the facial image and the central position or the center of mass of the representative unit, the certain number being smaller than the representative facial image number by one.

According to the above structure, a facial image whose position is closest to the central position or the center of mass of the representative unit has the highest possibility of being accurately grouped into the representative unit. On the other hand, the longer the distance between the position of a facial image and the central position or the center of mass of the representative unit, the higher the possibility of the facial image being inaccurately grouped into the representative unit. Accordingly, the above structure allows the user to, for example, correct the grouping of facial images while looking at both (i) facial images that have a high possibility of being accurately grouped and (ii) facial images that have a high possibility of being inaccurately grouped. This makes it possible for the user to perform efficient annotation.

<Device Operations>

The following describes three processing performed by the representative image display device 1 shown in FIG. 1, namely, (i) processing to automatically group facial images (hereinafter, "automatic grouping processing"), (ii) processing to correct facial image grouping in accordance with an annotation provided by the user (hereinafter, "grouping correction processing"), and (iii) processing to select one or more representative facial images from among all facial images and display the representative facial images (hereinafter, "facial image selection/display processing").

(Operations for Automatic Grouping Processing)

Figure 5:
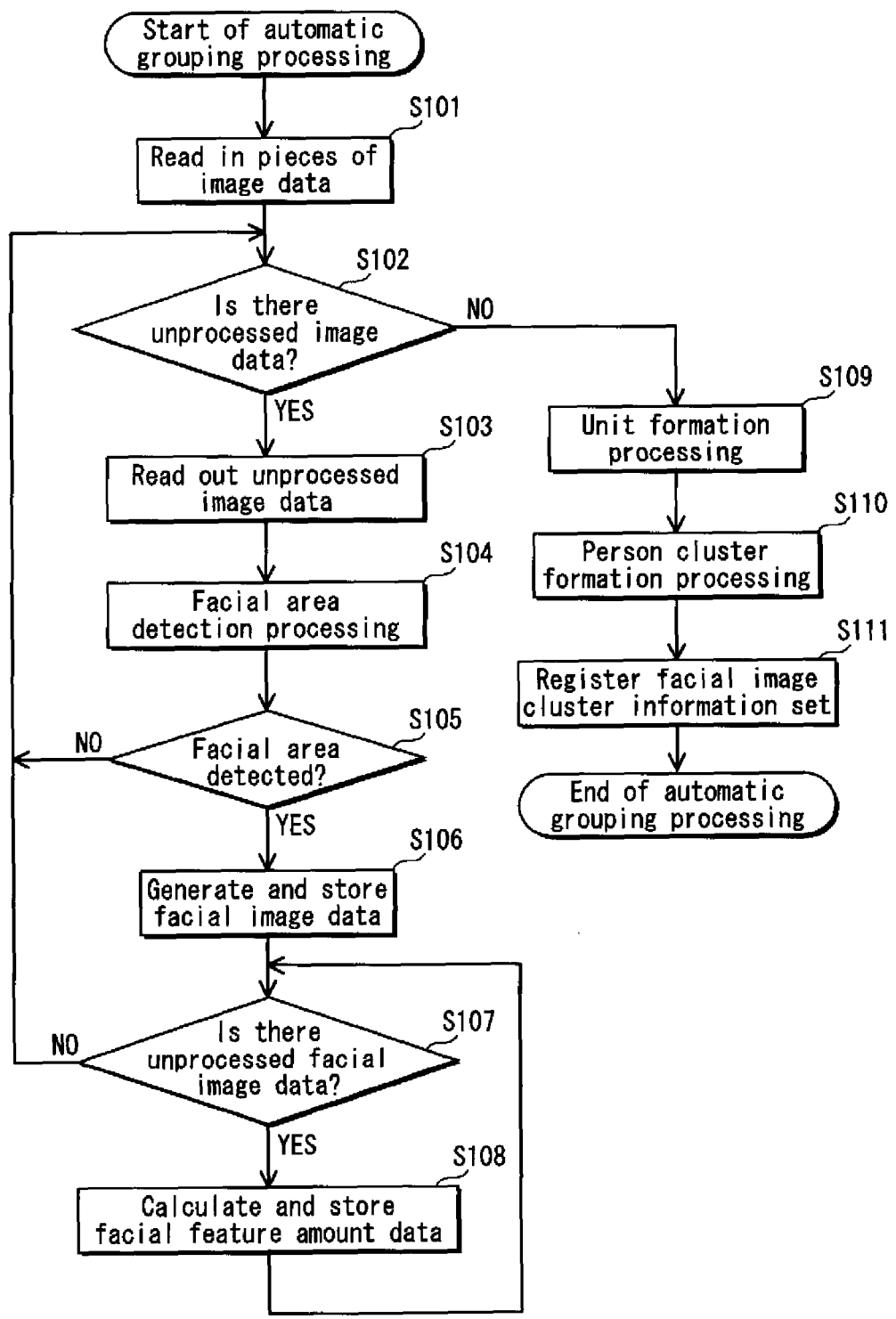
FIG. 5 is a flowchart of automatic grouping processing performed by the representative image display device shown in FIG. 1.

FIG. 5 is a flowchart of the automatic grouping processing performed by the representative image display device 1 shown in FIG. 1.

The image input part 110 sequentially reads in pieces of image data of images captured by, for example, an imaging device, from the imaging device. Then, the image input part 110 (i) assigns a unique image ID to each image, (ii) stores the following into the image DB 21 in correspondence with each image ID: the imaging time when the corresponding image was captured; and the image file name assigned to the image data of the corresponding image, and (iii) stores the pieces of image data into the storage unit 20 (Step S101).

The facial recognition processing part 120 judges whether there is any image ID that has not been subjected to image recognition processing, namely, whether there is any image data on which the image recognition processing has not been performed (hereinafter, "unprocessed image data") (Step S102). When there is at least one piece of unprocessed image data (the YES branch of S102), the facial recognition processing part 120 reads out one piece of unprocessed image data from the storage unit 20 (Step S103), and detects a facial area of a person shown in the image by performing the image recognition processing on the read piece of unprocessed image data (Step S104).

The facial recognition processing part 120 judges whether a facial area has been detected after the image recognition processing (Step S105). When no facial area has been detected (the NO branch of S105), the representative image display device 1 returns to the processing of Step S102. On the other hand, when one or more facial areas have been detected (the YES branch of S105), the facial recognition processing part 120 generates facial image data of a facial image corresponding to each facial area detected. Thereafter, the facial recognition processing part 120 (i) assigns a unique face ID to the facial image corresponding to each facial area, (ii) stores the following into the facial image DB 22 in correspondence with each face ID: the image ID of the image including the corresponding facial image; and the facial image file name assigned to the facial image data of the corresponding facial image, and (iii) stores the pieces of facial image data into the storage unit 20 (Step S106).

The facial recognition processing part 120 judges whether there is any face ID that has not been subjected to processing of calculating facial feature amount data, namely, whether there is any facial image data whose facial feature amount data has not been calculated (hereinafter, "unprocessed facial image data") (Step S107). When there is at least one piece of unprocessed facial image data (the YES branch of S107), the facial recognition processing part 120 reads out one piece of unprocessed facial image data from the storage unit 20, and generates facial feature amount data of the facial image from the read piece of unprocessed facial image data. Then, the facial recognition processing part 120 (i) stores, in correspondence with the face ID of the facial image, a facial feature amount file name assigned to the facial feature amount data of the facial image, into the facial image DB 22, and (ii) stores the facial feature amount data into the storage unit 20 (Step S108). Thereafter, the representative image display device 1 returns to the processing of Step S107.

When there is no unprocessed facial image data (the NO branch of S107), it means that the facial feature amount data has been calculated for every facial image included in the image of the image data read out in Step S103. Hence, the representative image display device 1 returns to the processing of Step S102 to process another unprocessed image data.

When there is no unprocessed image data (the NO branch of S102), the cluster formation part 130 refers to the facial image DB 22 and reads out, from the storage unit 20, the facial feature amount data assigned the facial feature amount file name corresponding to each face ID. Then, the cluster formation part 130 (i) groups similar facial images together by using each facial feature amount data that has been read out, (ii) forms one or more units by including each group of similar facial images in a different one of the units, and (iii) assigns a unit ID to each unit formed (Step S109). Thereafter, the cluster formation part 130 (i) groups similar units together by using each facial feature amount data, (ii) forms one or more person clusters by including each group of similar units in a corresponding one of the person clusters, and (iii) assigns a person ID to each person cluster formed (Step S110). The cluster formation part 130 then stores, in correspondence with each facial image, a facial image cluster information set into the facial image cluster DB 23 (Step S111). Here, in each of the facial image cluster information sets, the operator information shows "System" and the grouping time information shows the time when the corresponding facial image was automatically grouped.

(Operations for Grouping Correction Processing)

Figure 6:
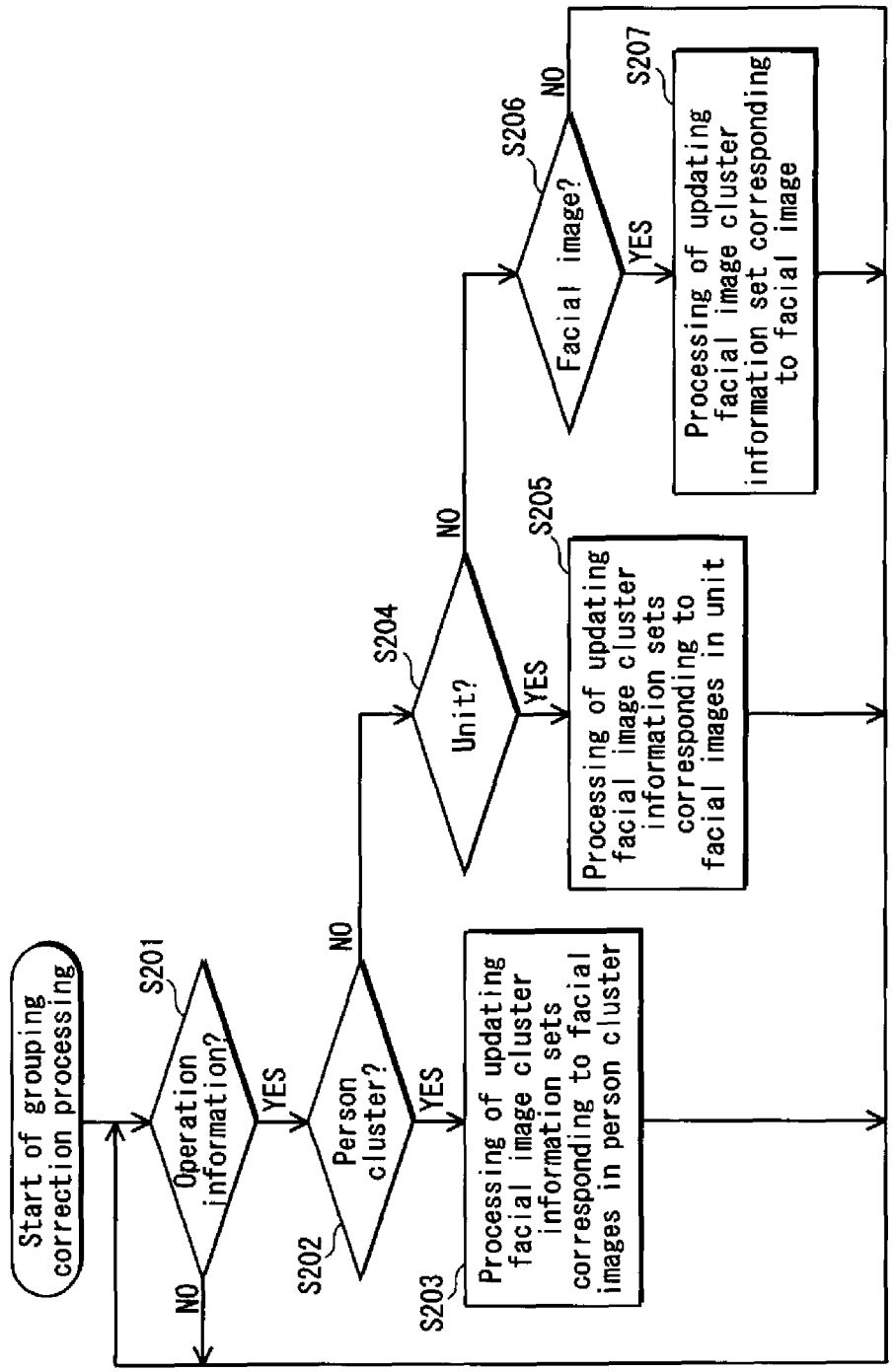
FIG. 6 is a flowchart of grouping correction processing performed by the representative image display device shown in FIG. 1.

FIG. 6 is a flowchart of the grouping correction processing performed by the representative image display device 1 shown in FIG. 1. By using information relating to the display layout, which is input from the display layout control part 210, and a signal input from the operation IF unit 40, the cluster correction part 140 judges (i) a selection target, which is a target of selection made by the user (a person cluster, a unit, or a facial image), and (ii) a destination to which the user has drag-and-dropped the selection target (a move destination of the selection target).

The cluster correction part 140 judges whether it has received operation information relating to the user operation from the operation IF unit 40 (Step S201). When the cluster correction part 140 has not yet received the operation information from the operation IF unit 40 (the NO branch of S201), it returns to the processing of Step S201.

When the cluster correction part 140 has received the operation information (the YES branch of S201), the cluster correction part 140 judges whether the user's selection target is a person cluster (Step S202). When the selection target is a person cluster (the YES branch of Step S202), the cluster correction part 140 corrects the facial image cluster information sets that are stored in the facial image cluster DB 23 and correspond to facial images included in the selected person cluster (Step S203). Specifically, the cluster correction part 140 corrects the person ID, the operator information and the grouping time information included in each of these facial image cluster information sets to show the person ID assigned to the person cluster of the move destination, "User", and the time when the grouping of the selected person cluster was corrected, respectively.

When the selection target is not a person cluster (the NO branch of S202), the cluster correction part 140 judges whether the selection target is a unit (Step S204). When the selection target is a unit (the YES branch of S204), the cluster correction part 140 corrects the facial image cluster information sets that are stored in the facial image cluster DB 23 and correspond to facial images included in the selected unit (Step S205). Specifically, when the move destination of the selected unit is another person cluster, the cluster correction part 140 corrects the person ID, the operator information and the grouping time information included in each of these facial image cluster information sets to show the person ID assigned to the person cluster of the move destination, "User" and the time when the grouping of the selected unit was corrected, respectively. When the move destination of the selected unit is an area where no person cluster exists, the cluster correction part 140 corrects the person ID, the operator information and the grouping time information included in each of these facial image cluster information sets to show a person ID that has never been assigned, "User" and the time when the grouping of the selected unit was corrected, respectively. When the move destination of the selected unit is another unit, the cluster correction part 140 corrects the person ID, the unit ID, the operator information and the grouping time information included in each of these facial image cluster information sets to show the person ID assigned to the person cluster to which the unit of the move destination belongs, the unit ID assigned to the unit of the move destination, "User", and the time when the grouping of the selected unit was corrected, respectively.

When the selection target is not a unit (the NO branch of S204), the cluster correction part 140 judges whether the selection target is a facial image (Step S206). When the selection target is not a facial image (the NO branch of S206), the cluster correction part 140 returns to the processing of Step S201. On the other hand, when the selection target is a facial image (the YES branch of S206), the cluster correction part 140 corrects the facial image cluster information set that is stored in the facial image cluster DB 23 and corresponds to the selected facial image (Step S207). Specifically, when the move destination of the selected facial image is a person cluster, the cluster correction part 140 corrects the person ID, the unit ID, the operator information and the grouping time information included in this facial image cluster information set to show the person ID assigned to the person cluster of the move destination, a unit ID that has never been assigned, "User", and the time when the grouping of the selected facial image was corrected, respectively. When the move destination of the selected facial image is another unit, the cluster correction part 140 corrects the person ID, the unit ID, the operator information and the grouping time information included in this facial image cluster information set to show the person ID assigned to the person cluster to which the unit of the move destination belongs, the unit ID assigned to the unit of the move destination, "User", and the time when the grouping of the selected facial image was corrected, respectively. When the move destination of the selected facial image is an area where no person cluster exists, the cluster correction part 140 corrects the person ID, the unit ID, the operator information and the grouping time information included in this facial image cluster information set to show a person ID that has never been assigned, a unit ID that has never been assigned, "User", and the time when the grouping of the selected facial image was corrected, respectively.

(Operations for Facial Image Selection/Display Processing)

Figure 7:
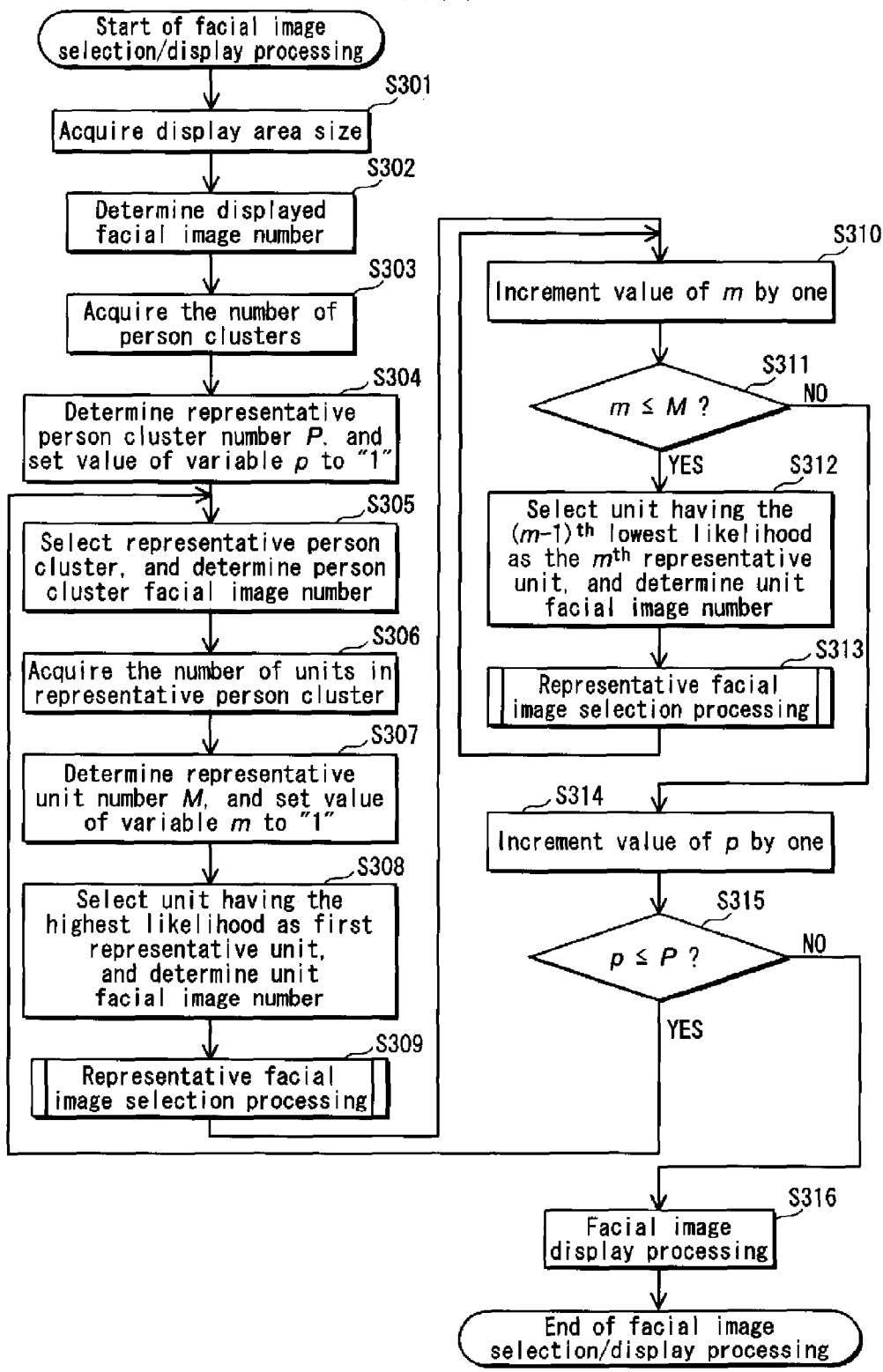
FIG. 7 is a flowchart of facial image selection/display processing performed by the representative image display device shown in FIG. 1.

FIG. 7 is a flowchart of the facial image selection/display processing performed by the representative image display device 1 shown in FIG. 1.

The number determination part 220 acquires the display area size of the display unit 30 (Step S301), and determines the displayed facial image number by using the display size of each facial image and the acquired display area size (Step S302).

The person cluster selection part 230 refers to the facial image cluster DB 23 and acquires the number of person IDs, namely, the number of person clusters (Step S303). Then, by using the displayed facial image number determined in Step S302 and the number of person clusters acquired in Step S303, the person cluster selection part 230 (i) determines a representative person cluster number P, which is the number of person clusters from which facial images should be displayed on the display unit 30 (representative person clusters), and (ii) sets a value of a variable p to "1" (Step S304).

The person cluster selection part 230 selects a person cluster that includes the $p^{th}$ largest number of facial images as a representative person cluster (with p being the value of the aforementioned variable p). By using the displayed facial image number determined in Step S302 and the number of person clusters acquired in Step S303, the person cluster selection part 230 determines a person cluster facial image number, which is the number of representative facial images to be displayed from the selected representative person cluster (Step S305).

The unit selection part 240 refers to the facial image cluster DB 23 and acquires the number of unit IDs, i.e., the number of units, in the representative person cluster selected in Step S305 (Step S306). By using the person cluster facial image number determined in Step S305 and the number of units acquired in Step S306, the unit selection part 240 (i) determines a representative unit number M that is the number of units which are included in the selected representative person cluster and from which facial images should be displayed on the display unit 30 (representative units), and (ii) sets a value of a variable m to "1" (Step S307).

The unit selection part 240 selects, from among all the units in the selected representative person cluster, a unit having the highest likelihood as a first representative unit. By using the person cluster facial image number determined in Step S305 and the number of units acquired in Step S306, the unit selection part 240 determines a unit facial image number, which is the number of representative facial images to be displayed from the selected first representative unit (Step S308). At this time, the unit selection part 240 outputs, to the display layout control part 210, the unit ID of the first representative unit and the order in which the first representative unit is selected from the representative person cluster.

Figure 8:
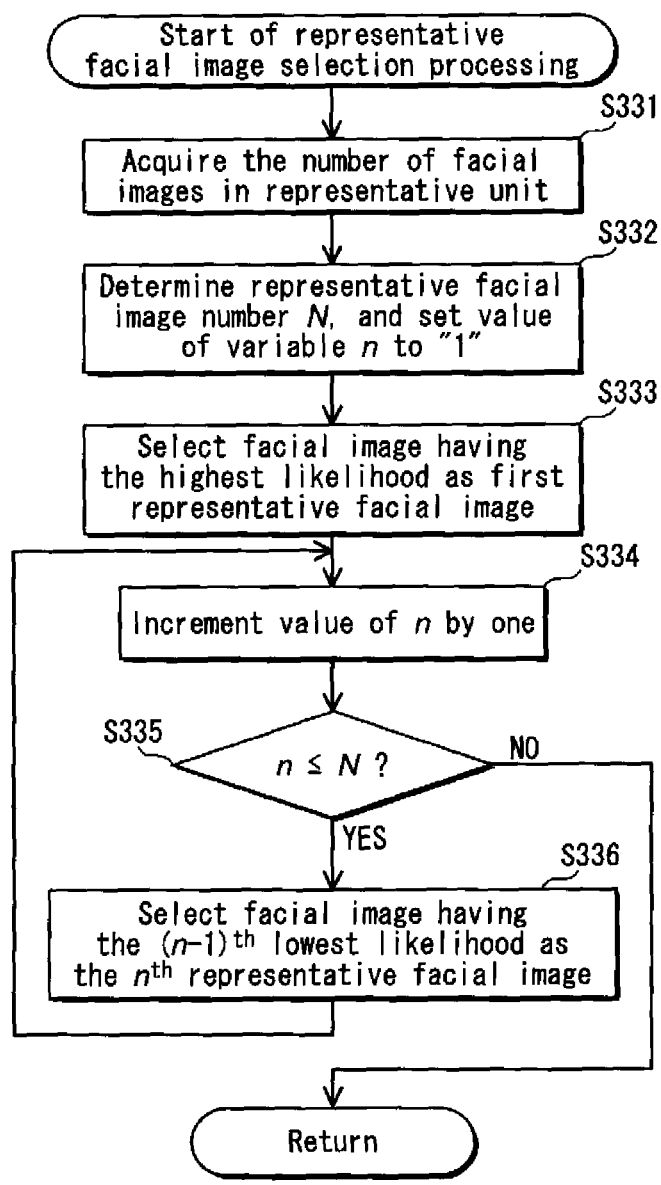
FIG. 8 is a flowchart of representative facial image selection processing shown in FIG. 7.

By performing representative facial image selection processing, whose operational flow is illustrated in FIG. 8, the representative facial image selection part 250 selects one or more representative facial images from among all the facial images included in the first representative unit (Step S309).

The unit selection part 240 increments the value of the variable m by one (Step S310), and judges whether the incremented value of the variable m is smaller than or equal to the representative unit number M (Step S311).

When the incremented value of the variable m is smaller than or equal to the representative unit number M (the YES branch of S311), the unit selection part 240 selects, from among all the units in the representative person cluster, a unit having the $(m-1)^{th}$ highest likelihood as the $m^{th}$ representative unit. By using the person cluster facial image number determined in Step S305 and the number of units acquired in Step S306, the unit selection part 240 determines a unit facial image number, which is the number of representative facial images to be displayed from the $m^{th}$ representative unit (Step S312). At this time, the unit selection part 240 outputs, to the display layout control part 210, the unit ID of the $m^{th}$ representative unit and the order in which the $m^{th}$ representative unit is selected from the representative person cluster.

By performing the representative facial image selection processing, whose operational flow is illustrated in FIG. 8, the representative facial image selection part 250 selects one or more representative facial images from among all the facial images included in the $m^{th}$ representative unit (Step S313). Thereafter, the processing of FIG. 7 returns to Step S310.

When the incremented value of the variable m is neither smaller than nor equal to the representative unit number M (the NO branch of S311), the person cluster selection part 230 increments the value of the variable p by one (Step S314), and judges whether the incremented value of the variable p is smaller than or equal to the representative person cluster number P (Step S315). When the incremented value of the variable p is smaller than or equal to the representative person cluster number P (the YES branch of S315), it means that the number of representative person clusters that have been selected up until that point is not equal to the representative person cluster number P, and therefore the processing of FIG. 7 returns to Step S305.

When the incremented value of the variable p is neither smaller than nor equal to the representative person cluster number P (the NO branch of S315), the display layout control part 210 performs display control to display all the representative facial images on the display unit 30, based on the result of executing the processing of Steps S301 through S315 (Step S316). At this time, the display layout control part 210 displays borders that respectively indicate areas of all the representative person clusters. Within the border of each representative person cluster, the display layout control part 210 arranges the first to $M^{th}$ representative units included in the representative person cluster. Here, the area of the first representative unit is displayed enclosed by a thick border, and the areas of the second to $M^{th}$ representative units are each displayed enclosed by a thin border. Within the border of each representative unit, the display layout control part 210 arranges the first to $N^{th}$ representative facial images included in the representative unit. Here, the first representative facial image is displayed enclosed by a thick border, and the second to $N^{th}$ representative facial images are each displayed enclosed by a thin border. It should be noted that the first to $N^{th}$ representative facial images are selected through the representative facial image selection processing, whose operational flow is illustrated in FIG. 8. The above display method enables the user to easily distinguish (i) a representative unit having high likelihood from a representative unit having low likelihood, and (ii) a representative facial image having high likelihood from a representative facial image having low likelihood.

Operations for Representative Facial Image Selection Processing

FIG. 8 is a flowchart of the representative facial image selection processing, which is shown in FIG. 7.

The representative facial image selection part 250 refers to the facial image cluster DB 23, and acquires the number of facial images included in the selected representative unit (Step S331). By using the unit facial image number determined in Step S308 or S312 and the number of units acquired in Step 5331, the representative facial image selection part 250 determines a representative facial image number N, which is the number of facial images to be displayed from the representative unit on the display unit 30, and sets a value of a variable n to "1" (Step S332).

The representative facial image selection part 250 selects, from among all the facial images in the representative unit, a facial image having the highest likelihood as a first representative facial image (Step S333). At this time, the representative facial image selection part 250 outputs, to the display layout control part 210, the face ID of the first representative facial image and the order in which the first representative facial image is selected from the representative unit.

The representative facial image selection part 250 increments the value of the variable n by one (Step S334), and judges whether the incremented value of the variable n is smaller than or equal to the representative facial image number N (Step S335). When the incremented value of the variable n is smaller than or equal to the representative facial image number N (the YES branch of S335), the representative facial image selection part 250 selects, from among all the facial images in the selected representative unit, a facial image having the $(n-1)^{th}$ lowest likelihood as the $n^{th}$ representative facial image (Step S336). At this time, the representative facial image selection part 250 outputs, to the display layout control part 210, the face ID of the $n^{th}$ representative facial image and the order in which the $n^{th}$ representative facial image is selected from the representative unit. After Step S336, the processing of FIG. 8 returns to Step S334.

When the incremented value of the variable n is neither smaller than nor equal to the representative facial image number N (the NO branch of S335), it means that all the representative facial images have been selected from the representative unit, and therefore the processing of FIG. 8 moves to Step S310 of FIG. 7.

(Example of Processing Performed by Representative Image Display Device)

With reference to FIGS. 9 to 14, the following describes one example of a sequence of processing performed by the representative image display device 1 shown in FIG. 1.

Figure 9:
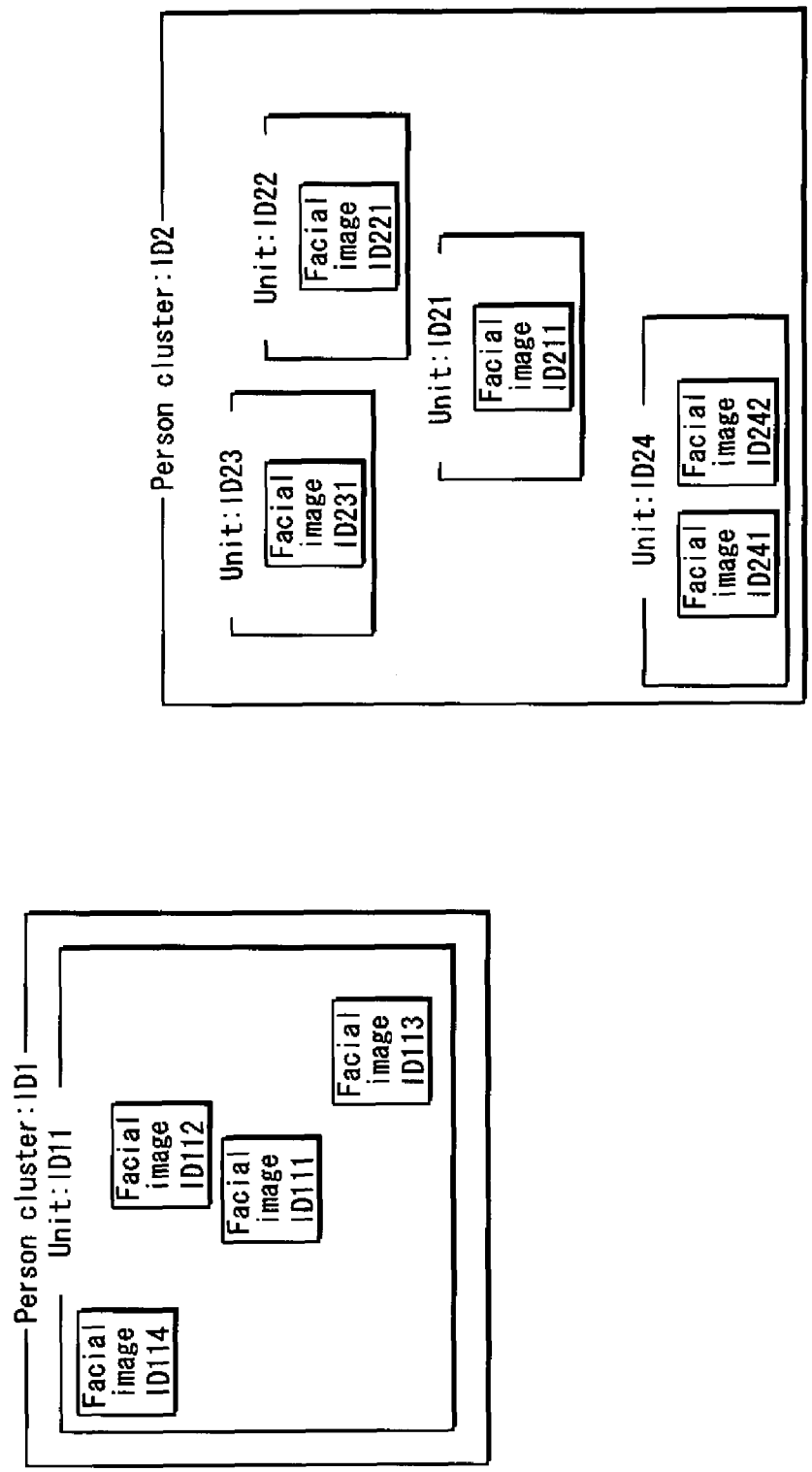
FIG. 9 schematically shows a result of facial image grouping in a feature space, in order to illustrate one example of processing performed by the representative image display device shown in FIG. 1.

FIG. 9 schematically shows a result of automatically grouping facial images in a feature space.

In FIG. 9, facial images "ID 111" to "ID 114" are grouped into a unit "ID 11", and the unit "ID 11" is grouped into a person cluster "ID 1". Facial images "ID 211", "ID 221" and "ID 231" are grouped into units "ID 21", "ID 22" and "ID 23", respectively. Facial images "ID 241" and "ID 242" are grouped into a unit "ID 24". The units "ID 21" to "ID 24" are grouped into a person cluster "ID 2".

The following description will be given under the assumption that (i) likelihoods of the facial images "ID 111", "ID 112", "ID 113" and "ID 114", which are included in the unit "ID 11", descend in this order, (ii) likelihoods of the units "ID 21", "ID 22", "ID 23" and "ID 24", which are included in the person cluster "ID 2", descend in this order, and (iii) the facial images "ID 241" and "ID 242", which are included in the unit "ID 24", descend in this order.

The following is an overview of facial image selection/display processing performed with respect to the grouping result schematically shown in FIG. 9. Below, it is assumed that the displayed facial image number is "6".

The person cluster selection part 230 selects the person cluster "ID 2", which includes the largest number of facial images, as a representative person cluster. The unit selection part 240 selects the unit "ID 21", which has the highest likelihood in the representative person cluster "ID 2", as a first representative unit. The representative facial image selection part 250 selects the facial image "ID 211", which has the highest likelihood in the first representative unit "ID 21", as a first representative facial image. Next, the unit selection part 240 selects the unit "ID 24", which has the lowest likelihood in the representative person cluster "ID 2", as a second representative unit. The representative facial image selection part 250 selects the facial image "ID 241", which has the highest likelihood in the second representative unit "ID 24", as a first representative facial image. The unit selection part 240 selects the unit "ID 23", which has the second lowest likelihood in the representative person cluster "ID 2", as a third representative unit. The representative facial image selection part 250 selects the facial image "ID 231", which has the highest likelihood in the third representative unit "ID 23", as a first representative facial image.

The person cluster selection part 230 selects the person cluster "ID 1", which includes the second largest number of facial images, as another representative person cluster. The unit selection part 240 selects the unit "ID 11", which has the highest likelihood in the representative person cluster "ID 1", as a first representative unit. The representative facial image selection part 250 selects the facial images "ID 111", "ID 114" and "ID 113", which have the highest, lowest and second lowest likelihoods in the first representative unit "ID 11", as first, second and third representative facial images, respectively.

Figure 10:
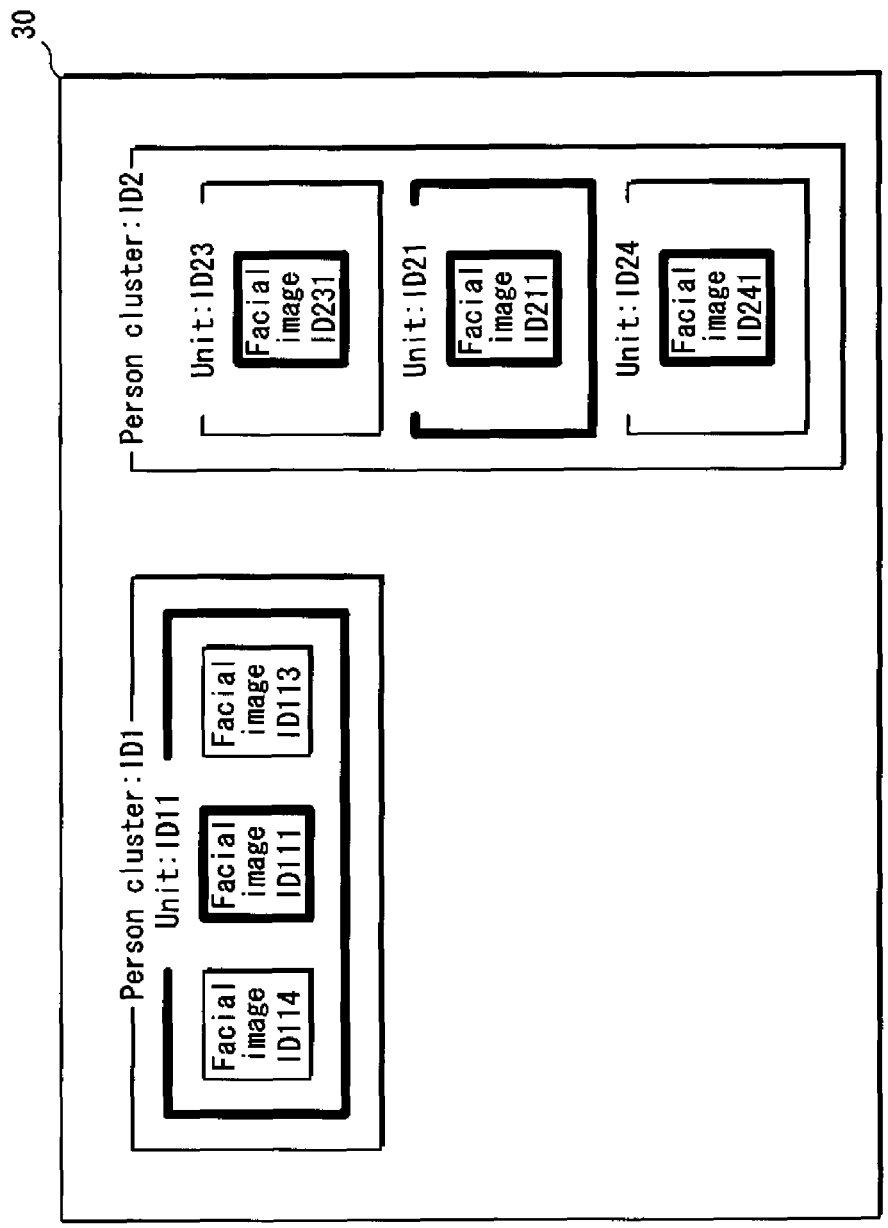
FIG. 10 shows items displayed on a display unit based on a result of the facial image selection/display processing, in order to illustrate one example of processing performed by the representative image display device shown in FIG. 1.

Based on the result of the above processing, the display layout control part 210 displays items shown in FIG. 10 on the display unit 30. FIG. 10 shows items displayed on the display unit 30 when the facial image selection/display processing has been performed with respect to the grouping result shown in FIG. 9.

The display layout control part 210 arranges the units "ID 21", "ID 23" and "ID 24" within the border of the person cluster "ID 2". Here, the unit "ID 21" (the first representative unit) is displayed enclosed by a thick border, and other units are each displayed enclosed by a thin border. The display layout control part 210 also arranges the facial images "ID 211", "ID 231" and "ID 241" within the borders of the units "ID 21", "ID 23" and "ID 24", respectively. Here, the facial images "ID 211", "ID 231" and "ID 241" (the first representative facial images) are each displayed enclosed by a thick border.

Furthermore, the display layout control part 210 arranges the unit "ID 11" within the border of the person cluster "ID 1". Here, the unit "ID 11" (the first representative unit) is displayed enclosed by a thick border. The display layout control part 210 also arranges the facial images "ID 111", "ID 113" and "ID 114" within the border of the unit "ID 11". Here, the facial image "ID 111" (the first representative facial image) is displayed enclosed by a thick border, and other facial images are each displayed enclosed by a thin border.

Figure 11:
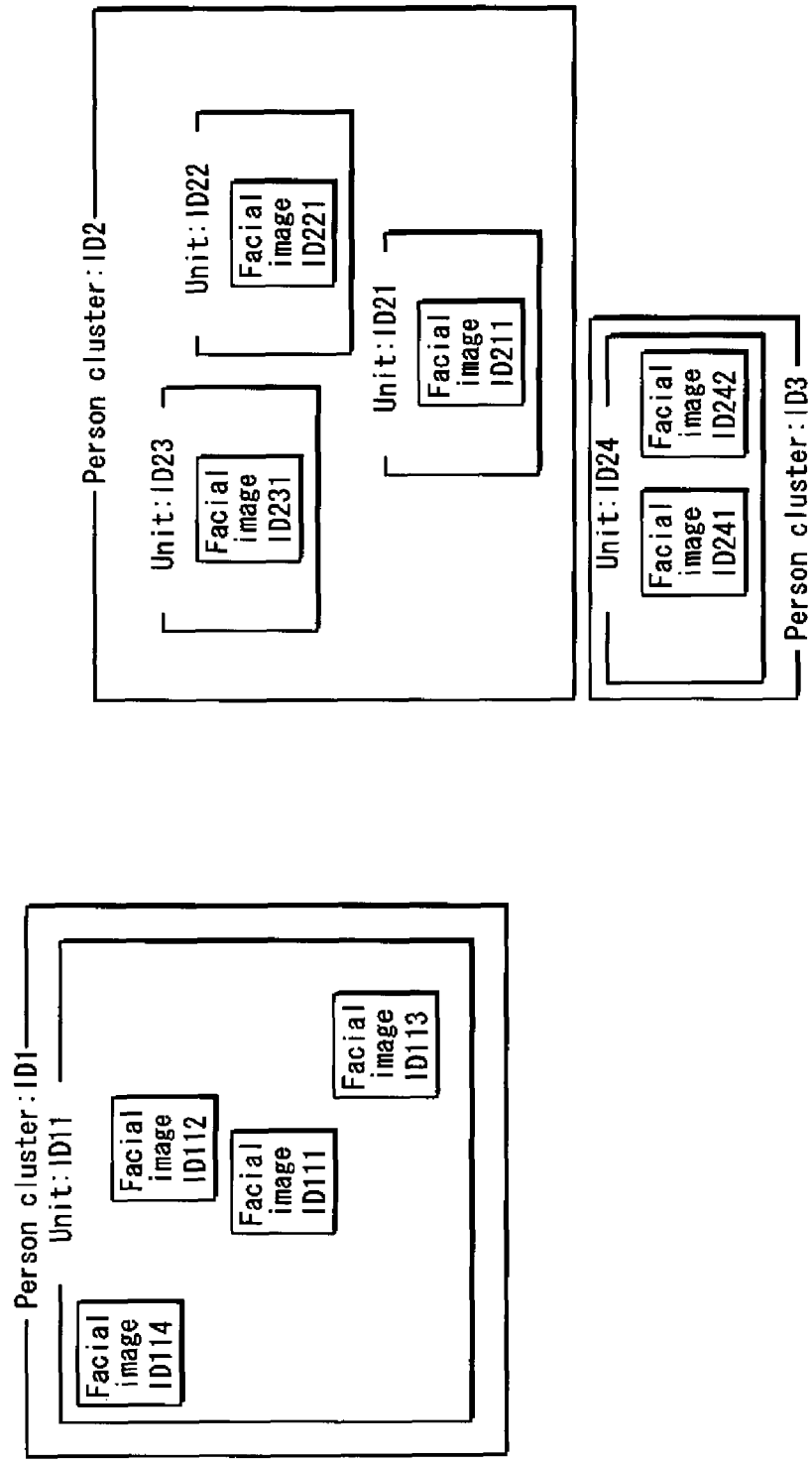
FIG. 11 schematically shows a result of facial image grouping in a feature space, in order to illustrate one example of processing performed by the representative image display device shown in FIG. 1.

Assume that while the items shown in FIG. 10 are displayed on the display unit 30, the user selects the unit "ID 24" and drag-and-drops the unit "ID 24" outside the borders of the person clusters "ID 1" and "ID 2". In response to this operation, the cluster correction part 140 corrects the person ID, the operator information and the grouping time information included in each of the facial image cluster information sets corresponding to the facial images "ID 241" and "ID 242" in the unit "ID 24" to show "ID 3", "User" and the time when the grouping of the facial images "ID 241" and "ID 242" was corrected, respectively. The result of thus correcting the grouping of the facial images "ID 241" and "ID 242" is shown in FIG. 11. FIG. 11 schematically shows the result of thus correcting the grouping of the facial images in a feature space.

In FIG. 11, the facial images "ID 111" to "ID 114" are grouped into the unit "ID 11", and the unit "ID 11" is grouped into the person cluster "ID 1". The facial images "ID 211", "ID 221" and "ID 231" are grouped into the units "ID 21", "ID 22" and "ID 23", respectively. The units "ID 21" to "ID 23" are grouped into the person cluster "ID 2". The facial images "ID 241" and "ID 242" are grouped into the unit "ID 24", and the unit "ID 24" is grouped into the person cluster "ID 3".

The following description will be given under the assumption that (i) likelihoods of the facial images "ID 111", "ID 112", "ID 113" and "ID 114" in the unit "ID 11" descend in this order, (ii) likelihoods of the units "ID 21", "ID 22" and "ID 23" in the person cluster "ID 2" descend in this order, and (iii) likelihoods of the facial images "ID 241" and "ID 242" in the unit "ID 24" descend in this order.

The following is an overview of facial image selection/display processing performed with respect to the grouping result schematically shown in FIG. 11. Below, it is assumed that the displayed facial image number is "6".

The person cluster selection part 230 selects the person cluster "ID 1" that includes the largest number of facial images as a representative person cluster. The unit selection part 240 selects the unit "ID 11" that has the highest likelihood in the representative person cluster "ID 1" as a first representative unit. The representative facial image selection part 250 selects the facial images "ID 111" and "ID 114", which have the highest and lowest likelihoods in the representative unit "ID 11", as first and second representative facial images, respectively.

The person cluster selection part 230 selects the person cluster "ID 2" that includes the second largest number of facial images as another representative person cluster. The unit selection part 240 selects the unit "ID 21" that has the highest likelihood in the representative person cluster "ID 2" as a first representative unit. The representative facial image selection part 250 selects the facial image "ID 211" that has the highest likelihood in the first representative unit "ID 21" as a first representative facial image. Next, the unit selection part 240 selects the unit "ID 23" that has the lowest likelihood in the representative person cluster "ID 2" as a second representative unit. The representative facial image selection part 250 selects the facial image "ID 231" that has the highest likelihood in the second representative unit "ID 23" as a first representative facial image.

The person cluster selection part 230 selects the person cluster "ID 3" that includes the third largest number of facial images as yet another representative person cluster. The unit selection part 240 selects the unit "ID 24" that has the highest likelihood in the representative person cluster "ID 3" as a first representative unit. The representative facial image selection part 250 selects the facial images "ID 241" and "ID 242", which have the highest and lowest likelihoods in the first representative unit "ID 24", as first and second representative facial images, respectively.

Figure 12:
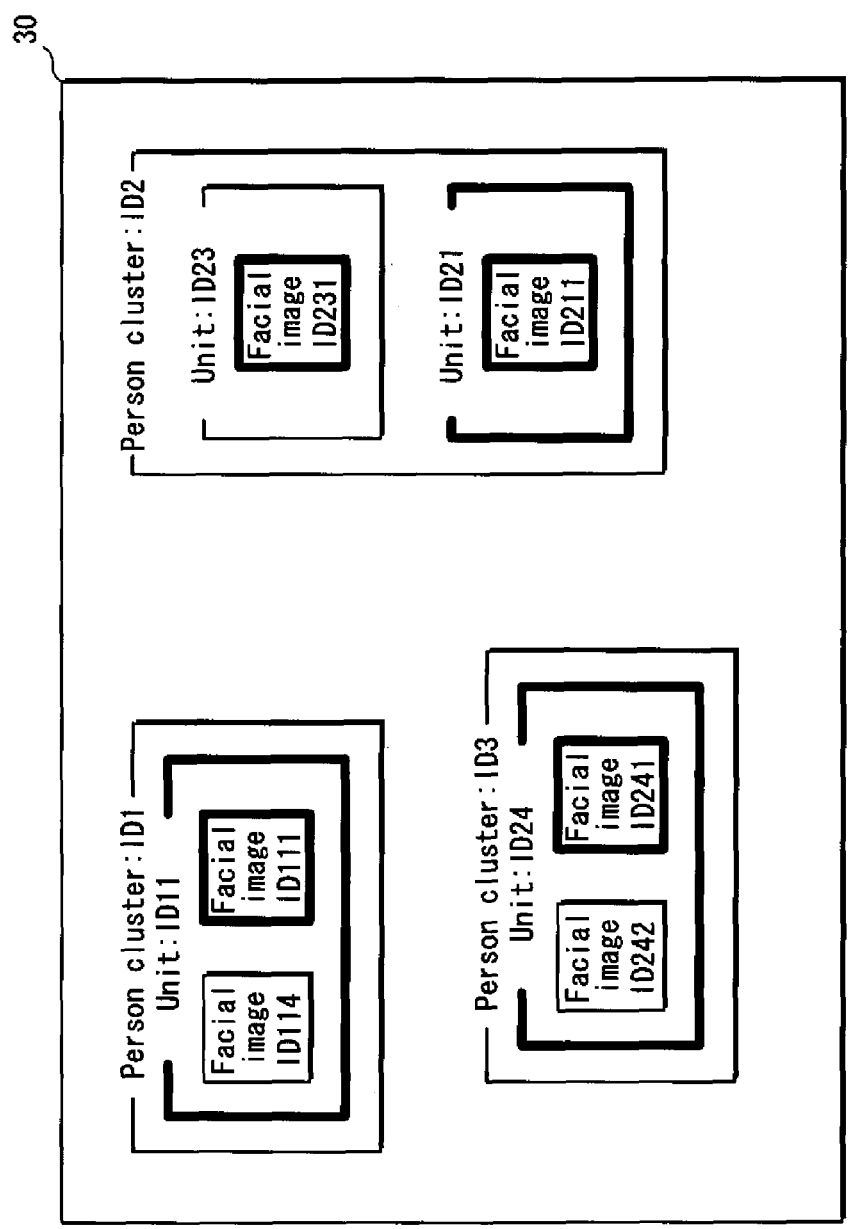
FIG. 12 shows items displayed on the display unit based on a result of the facial image selection/display processing, in order to illustrate one example of processing performed by the representative image display device shown in FIG. 1.

Based on the result of the above processing, the display layout control part 210 displays items shown in FIG. 12 on the display unit 30. FIG. 12 shows items displayed on the display unit 30 when the facial image selection/display processing has been performed with respect to the grouping result shown in FIG. 11.

The display layout control part 210 arranges the unit "ID 11" within the border of the person cluster "ID 1". Here, the unit "ID 11" (the first representative unit) is displayed enclosed by a thick border. The display layout control part 210 also arranges the facial images "ID 111" and "ID 114" within the border of the unit "ID 11". Here, the facial image "ID 111" (the first representative facial image) is displayed enclosed by a thick border, and the other facial image is displayed enclosed by a thin border.

Furthermore, the display layout control part 210 arranges the units "ID 21" and "ID 23" within the border of the person cluster "ID 2". Here, the unit "ID 21" (the first representative unit) is displayed enclosed by a thick border, and the other unit is displayed enclosed by a thin border. The display layout control part 210 also arranges the facial images "ID 211" and "ID 231" within the borders of the units "ID 21" and "ID 23", respectively. Here, the facial images "ID 211" and "ID 231" (the first representative facial images) are each displayed enclosed by a thick border.

Furthermore, the display layout control part 210 arranges the unit "ID 24" within the border of the person cluster "ID 3". Here, the unit "ID 24" (the first representative unit) is displayed enclosed by a thick border. The display layout control part 210 also arranges the facial images "ID 241" and "ID 242" within the border of the unit "ID 24". Here, the facial image "ID 241" (the first representative facial image) is displayed enclosed by a thick border, and the other facial image is displayed enclosed by a thin border.

Figure 13:
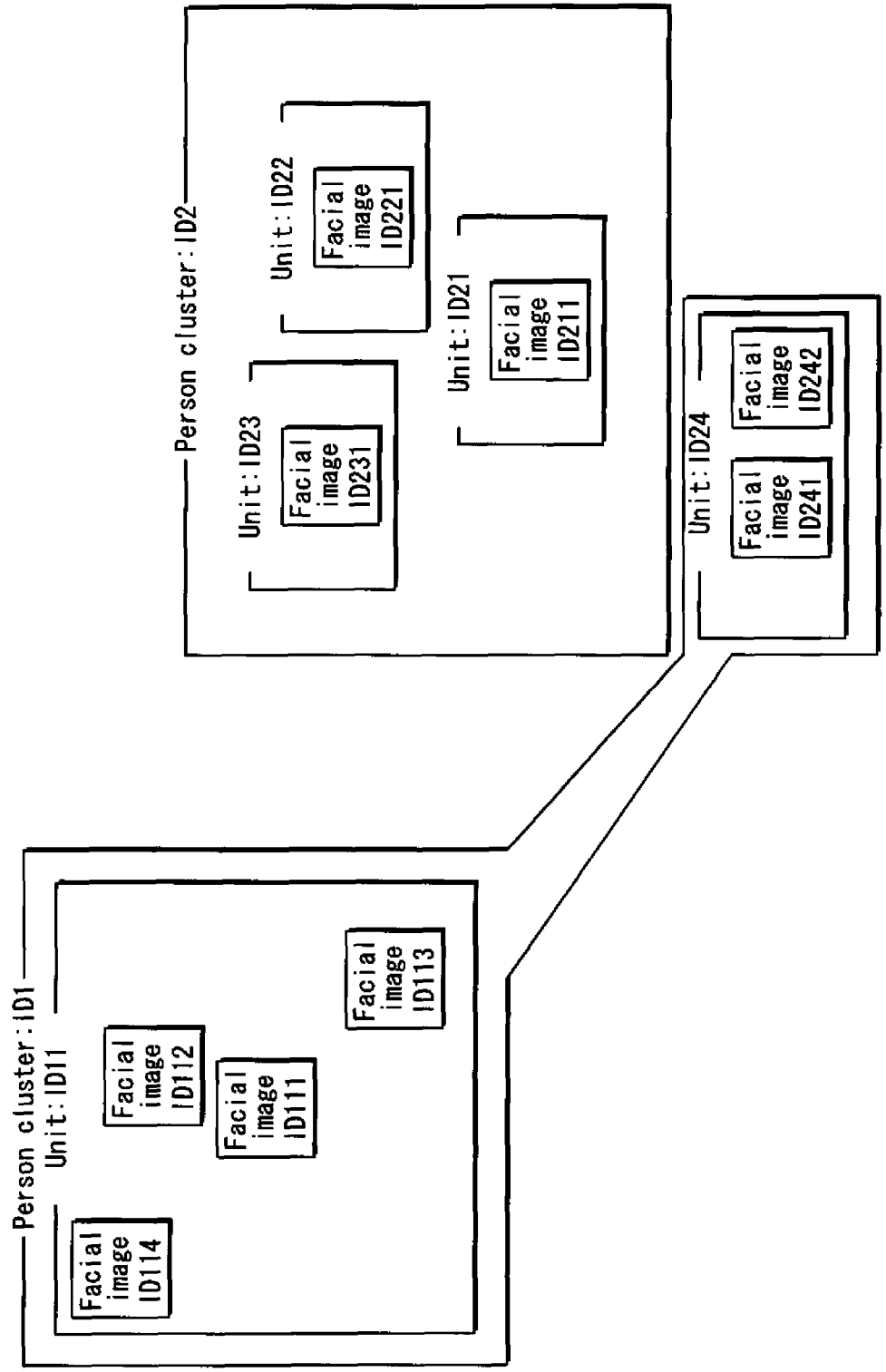
FIG. 13 schematically shows a result of facial image grouping in a feature space, in order to illustrate one example of processing performed by the representative image display device shown in FIG. 1.

Assume that while the items shown in FIG. 12 are displayed on the display unit 30, the user selects the person cluster "ID 3" and drag-and-drops the person cluster "ID 3" inside the border of the person cluster "ID 1". In response to this operation, the cluster correction part 140 corrects the person ID, the operator information and the grouping time information included in each of the facial image cluster information sets corresponding to the facial images "ID 241" and "ID 242" in the person cluster "ID 3" to show "ID 1", "User" and the time when the grouping of the facial images "ID 241" and "ID 242" was corrected, respectively. The result of thus correcting the grouping of the facial images "ID 241" and "ID 242" is shown in FIG. 13. FIG. 13 schematically shows the result of thus correcting the grouping of the facial images in a feature space.

In FIG. 13, the facial images "ID 111" to "ID 114" are grouped into the unit "ID 11", and the facial images "ID 241" and "ID 242" are grouped into the unit "ID 24". The units "ID 11" and "ID 24" are grouped into the person cluster "ID 1". The facial images "ID 211", "ID 221" and "ID 231" are grouped into the units "ID 21", "ID 22" and "ID 23", respectively. The units "ID 21" to "ID 23" are grouped into the person cluster "ID 2".

The following description will be given under the assumption that (i) likelihoods of the units "ID 11" and "ID 24" in the person cluster "ID 1" descend in this order, (ii) likelihoods of the facial images "ID 111", "ID 112", "ID 113" and "ID 114" in the unit "ID 11" descend in this order, (iii) likelihoods of the facial images "ID 241" and "ID 242" in the unit "ID 24" descend in this order, and (iv) likelihoods of the units "ID 21", "ID 22" and "ID 23" in the person cluster "ID 2" descend in this order.

The following is an overview of facial image selection/display processing performed with respect to the grouping result schematically shown in FIG. 13. Below, it is assumed that the displayed facial image number is "6".

The person cluster selection part 230 selects the person cluster "ID 1" that includes the largest number of facial images as a representative person cluster. The unit selection part 240 selects the unit "ID 11" that has the highest likelihood in the representative person cluster "ID 1" as a first representative unit. The representative facial image selection part 250 selects the facial images "ID 111" and "ID 114", which have the highest and lowest likelihoods in the first representative unit "ID 11", as first and second representative facial images, respectively. Next, the unit selection part 240 selects the unit "ID 24" that has the lowest likelihood in the representative person cluster "ID 1" as a second representative unit. The representative facial image selection part 250 selects the facial image "ID 241" that has the highest likelihood in the second representative unit "ID 24" as a first representative facial image.

The person cluster selection part 230 selects the person cluster "ID 2" that includes the second largest number of facial images as another representative person cluster. The unit selection part 240 selects the unit "ID 21" that has the highest likelihood in the representative person cluster "ID 2" as a first representative unit. The representative facial image selection part 250 selects the facial image "ID 211" that has the highest likelihood in the first representative unit "ID 21" as a first representative facial image. Next, the unit selection part 240 selects the unit "ID 23" that has the lowest likelihood in the representative person cluster "ID 2" as a second representative unit. The representative facial image selection part 250 selects the facial image "ID 231" that has the highest likelihood in the second representative unit "ID 23" as a first representative facial image. Furthermore, the unit selection part 240 selects the unit "ID 22" that has the second lowest likelihood in the representative person cluster "ID 2" as a third representative unit. The representative facial image selection part 250 selects the facial image "ID 221" that has the highest likelihood in the third representative unit "ID 22" as a first representative facial image.

Figure 14:
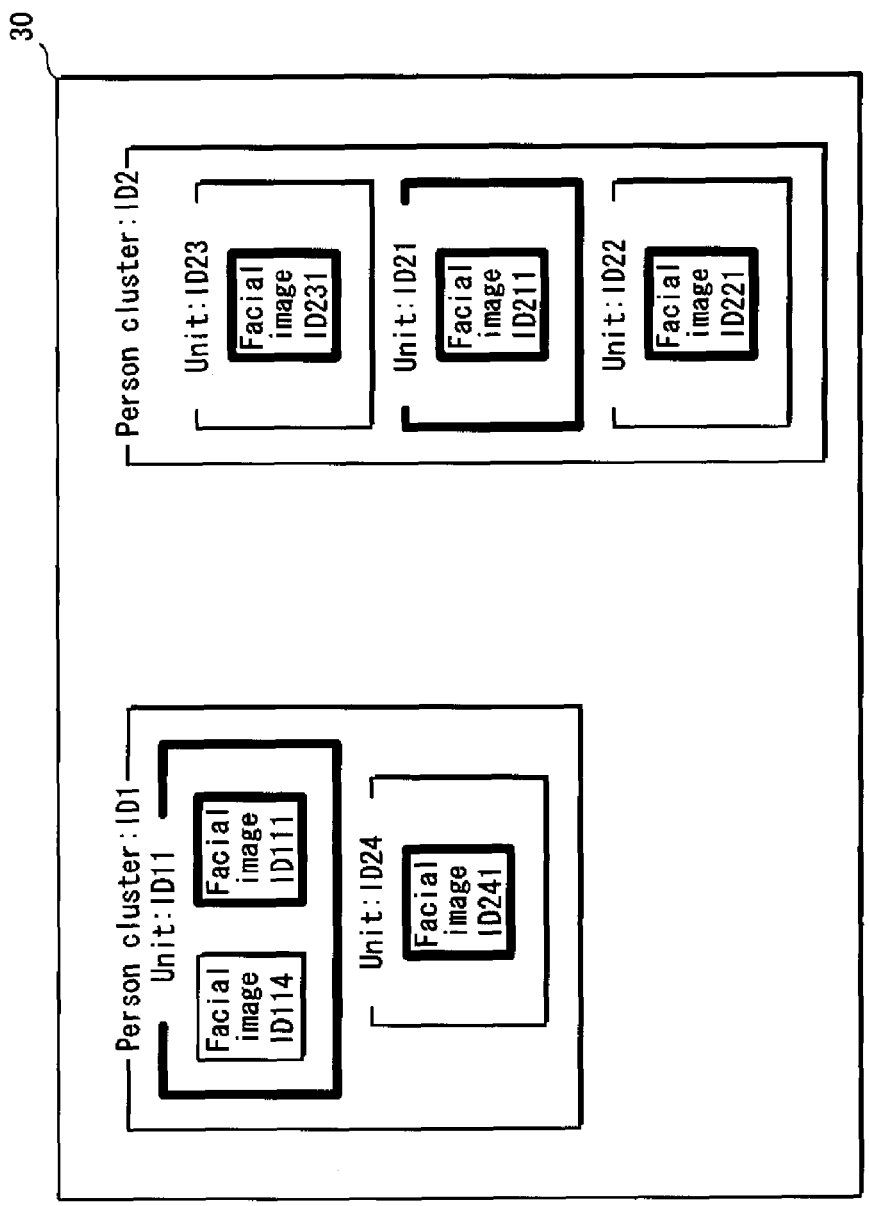
FIG. 14 shows items displayed on the display unit based on a result of the facial image selection/display processing, in order to illustrate one example of processing performed by the representative image display device shown in FIG. 1.

Based on the result of the above processing, the display layout control part 210 displays items shown in FIG. 14 on the display unit 30. FIG. 14 shows items displayed on the display unit 30 when the facial image selection/display processing has been performed with respect to the grouping result shown in FIG. 13.

The display layout control part 210 arranges the units "ID 11" and "ID 24" within the border of the person cluster "ID 1". Here, the unit "ID 11" (the first representative unit) is displayed enclosed by a thick border, and the other unit is displayed enclosed by a thin border. The display layout control part 210 also arranges the facial images "ID 111" and "ID 114" within the border of the unit "ID 11". Here, the facial image "ID 111" (the first representative facial image) is displayed enclosed by a thick border, and the other facial image is displayed enclosed by a thin border. The display layout control part 210 also arranges the facial image "ID 241" within the border of the unit "ID 24". Here, the facial image "ID 241" (the first representative facial image) is displayed enclosed by a thick border.

Furthermore, the display layout control part 210 arranges the units "ID 21", "ID 22" and "ID 23" within the border of the person cluster "ID 2". Here, the unit "ID 21" (the first representative unit) is displayed enclosed by a thick border, and other units are each displayed enclosed by a thin border. The display layout control part 210 also arranges the facial images "ID 211", "ID 221" and "ID 231" within the borders of the units "ID 21", "ID 22" and "ID 23", respectively. Here, the facial images "ID 211", "ID 221" and "ID 231" (the first representative facial images) are each displayed enclosed by a thick border.

[Second Embodiment]

A description is now given of the second embodiment of the present invention with reference to the accompanying drawings.

The first embodiment has introduced the following features. Similar facial images are grouped together, and each group of similar facial images is included in a different one of units. Similar units are grouped together, and each group of similar units is included in a different one of person clusters. Representative facial images are selected and displayed based on a result of the above grouping. In contrast, the present embodiment introduces the following features. Similar facial images are grouped together, and each group of similar facial images is included in a different one of person clusters. Representative facial images are selected and displayed based on a result of the above groping. Note, the "person clusters" pertaining to the present embodiment are equivalent to "clusters".

Also note, the structural elements of the present embodiment that are the same as in the first embodiment have the same reference numbers thereas. As these structural elements have already been explained in the first embodiment, the descriptions thereof are omitted from or only briefly discussed in the present embodiment.

<Device Structure>

Figure 15:
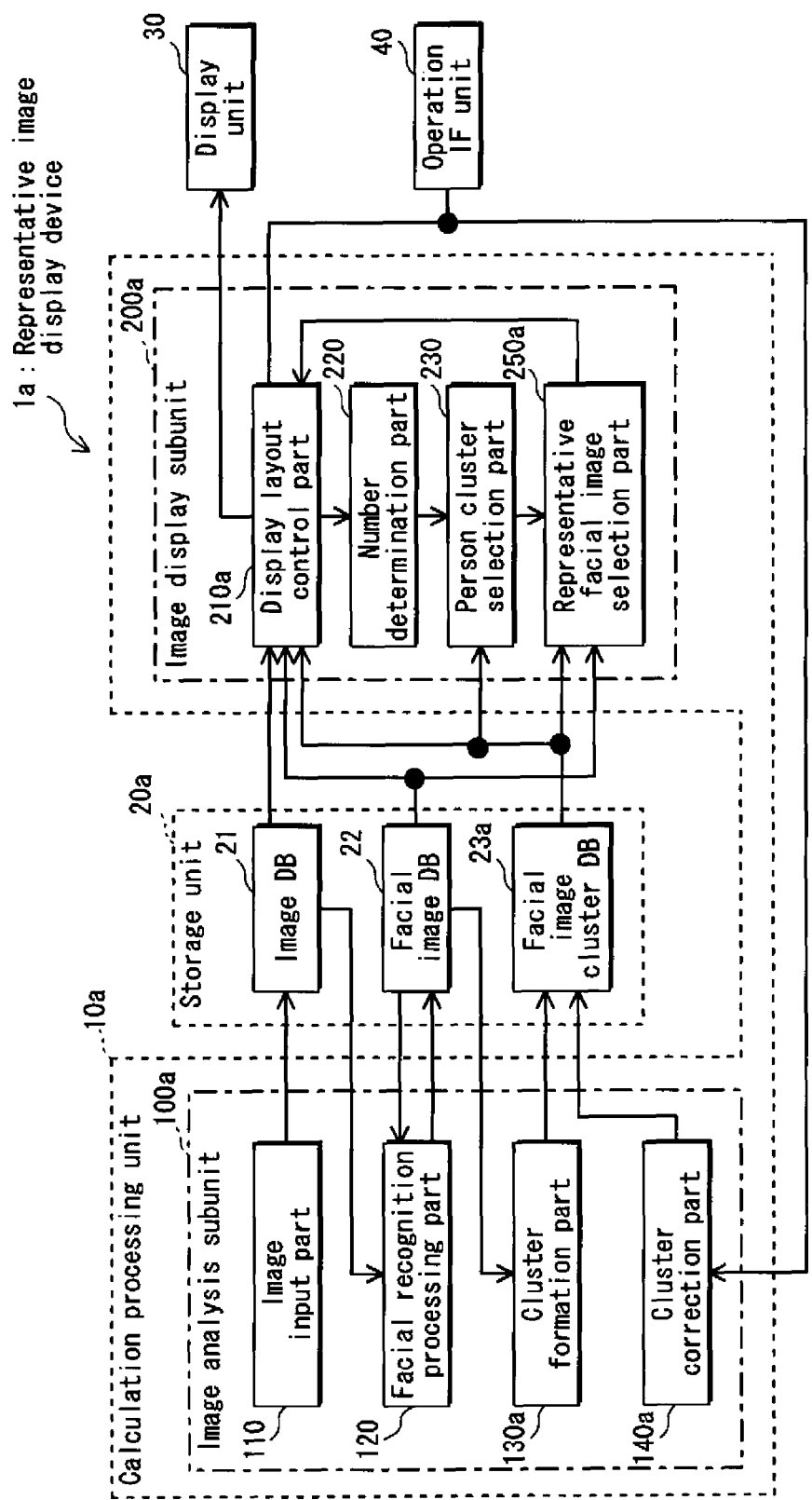
FIG. 15 shows an overall structure of a representative image display device pertaining to the second embodiment.

FIG. 15 shows an overall structure of a representative image display device 1a pertaining to the present embodiment. The representative image display device 1a is composed of a calculation processing unit 10a, a storage unit 20a, a display unit 30 and an operation IF unit 40.

The calculation processing unit 10a is constituted from CPU and the like, and performs various types of controls and calculations for the entirety of the representative image display device 1a.

Figure 17:
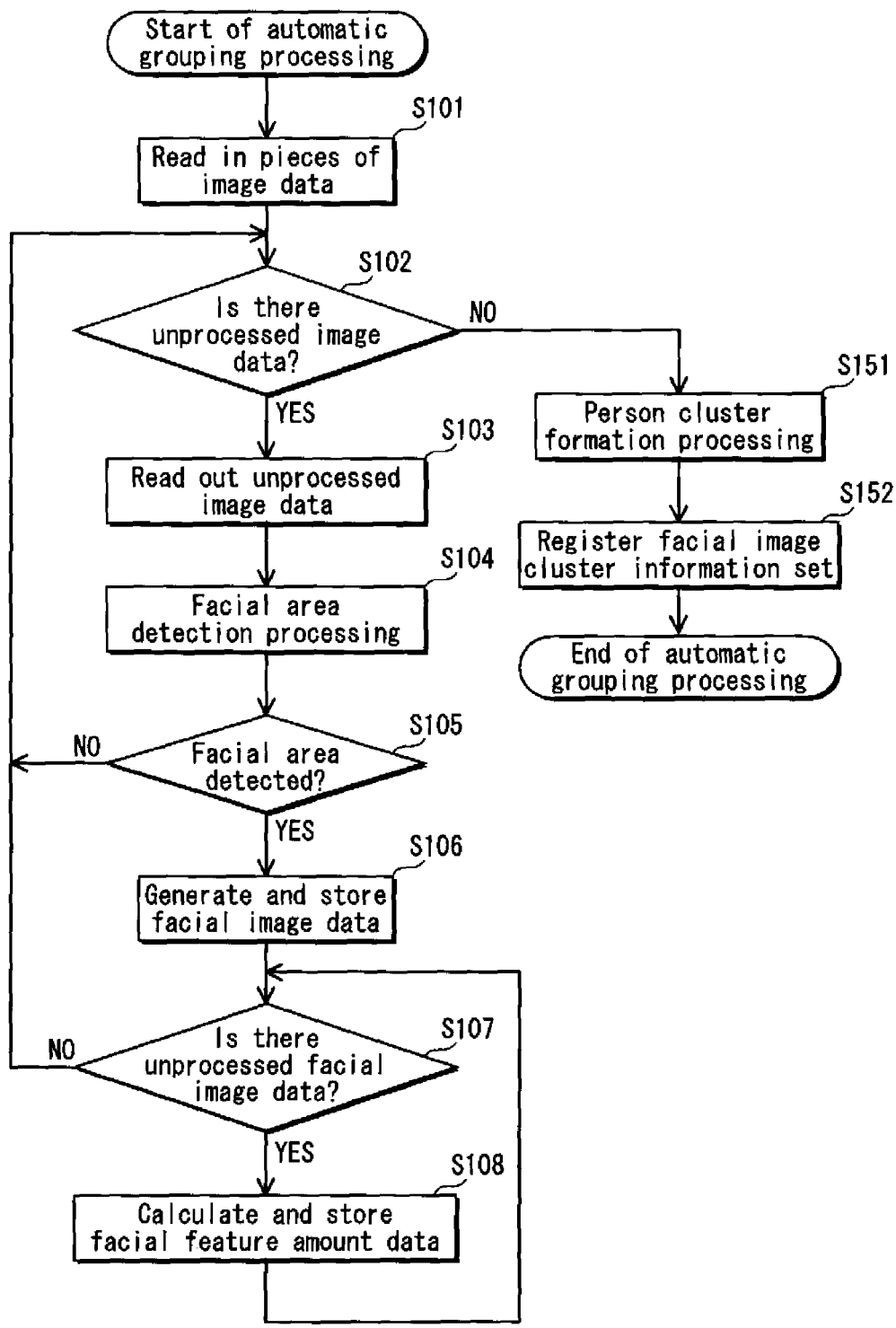
FIG. 17 is a flowchart of automatic grouping processing performed by the representative image display device shown in FIG. 15.
Figure 18:
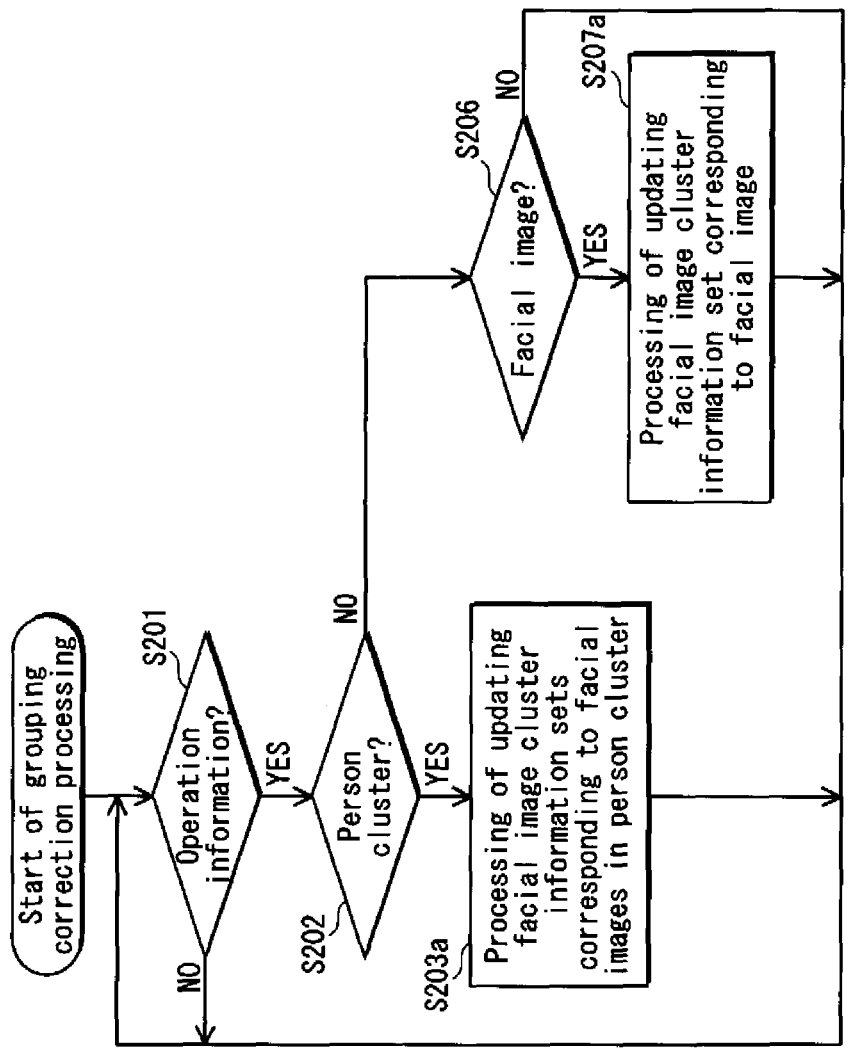
FIG. 18 is a flowchart of grouping correction processing performed by the representative image display device shown in FIG. 15.
Figure 19:
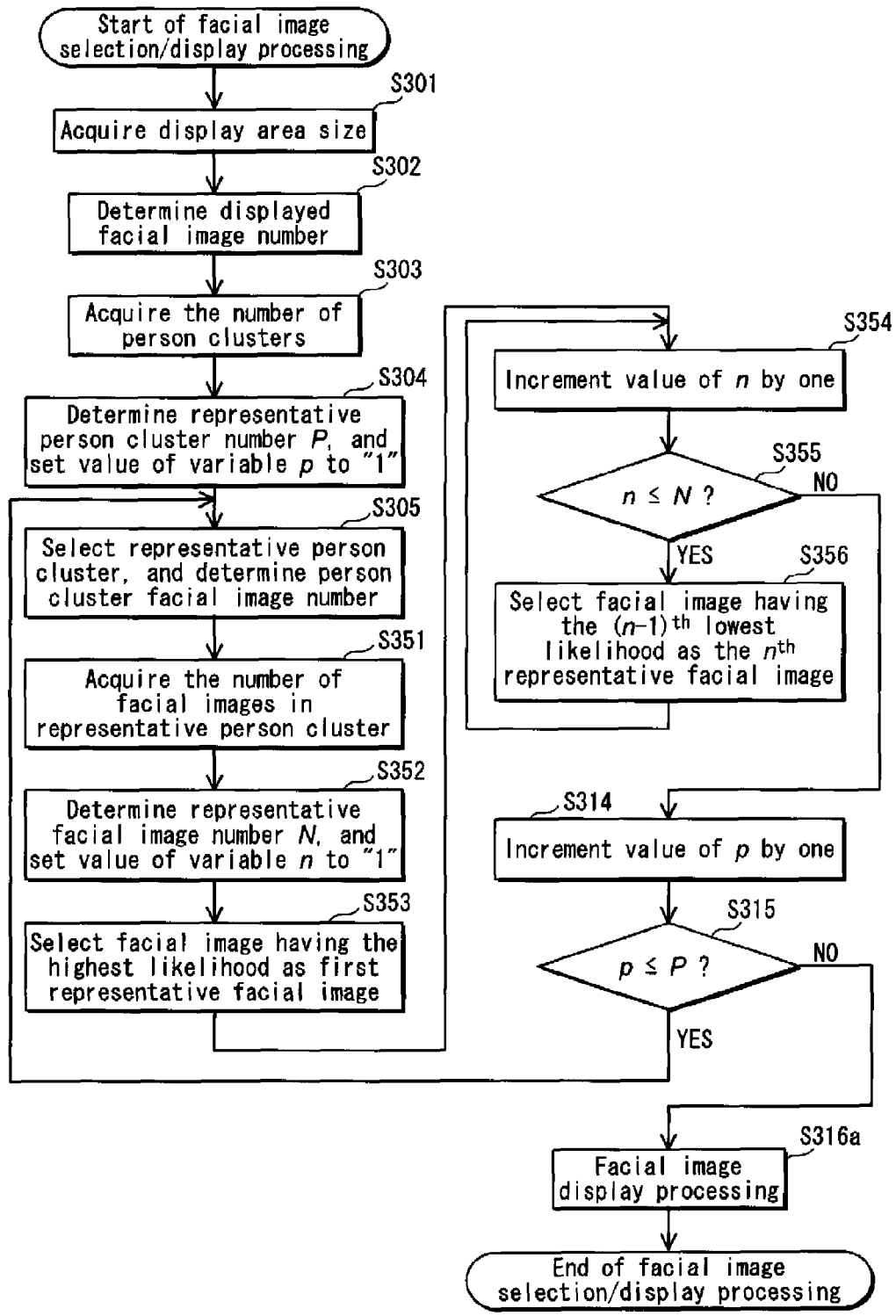
FIG. 19 is a flowchart of facial image selection/display processing performed by the representative image display device shown in FIG. 15.

The storage unit 20a is constituted from ROM, RAM, HDD, or the like, and stores therein various types of control programs for controlling the representative image display device 1a, various types of application programs, etc. The storage unit 20a also stores therein programs in which procedures indicating the operational flows of FIGS. 17 to 19 are written. The storage unit 20a also stores therein image data, facial image data, facial feature amount data, an image DB 21, a facial image DB 22, and a facial image cluster DB 23a.

(Structures of Databases in Storage Unit)

Structure of Facial Image Cluster DB

FIG. 16 shows one example of the facial image cluster DB 23a shown in FIG. 15. The facial image cluster DB 23a is a database for storing, in correspondence with each facial image, (i) a face ID of the facial image, (ii) an image ID of an image that includes the facial image, (iii) a person ID of a person cluster to which the facial image belongs to, (iv) operator information showing by whom/what the grouping of the facial image was performed, and (v) grouping time information showing the time when the grouping of the facial image was performed. Below, a set of pieces of information for one record of the facial image cluster DB 23a may be referred to as a "facial image cluster information set".

(Structure of Calculation Processing Unit)

The calculation processing unit 10a reads out, from the storage unit 20a, the programs in which the procedures indicating the operational flows of FIGS. 17 to 19 are written, and executes the read programs. By thus executing the read programs, the calculation processing unit 10a functions as an image analysis subunit 100a and an image display subunit 200a.

(Functions and Structure of Image Analysis Subunit)

As shown in FIG. 15, the image analysis subunit 100a includes an image input part 110, a facial recognition processing part 120, a cluster formation part 130a and a cluster correction part 140a.

The cluster formation part 130a refers to the facial image DB 22 and reads out, from the storage unit 20, the facial feature amount data assigned the facial feature amount file name corresponding to each face ID. By using each facial feature amount data that has been read out, the cluster formation part 130a groups similar facial images together, forms one or more person clusters by including each group of similar facial images in a different one of the person clusters, and assigns a unique person ID to each person cluster formed.

Thereafter, the cluster formation part 130a stores the following into the facial image cluster DB 23a in correspondence with each facial image: the face ID of the facial image; the image ID of the image that includes the facial image; the person ID of the person cluster to which the facial image belongs; and the grouping time information of the facial image. At this time, each operator information shows "System", and each grouping time information shows the time when the corresponding facial image was automatically grouped.

The cluster formation part 130a forms the person clusters in the following manner. The cluster formation part 130a compares pieces of facial feature amount data read out from the storage unit 20a with one another. Assuming that facial images are similar to one another when differences between pieces of facial feature amount data thereof are smaller than or equal to, for example, a predetermined threshold, the cluster formation part 130a groups these similar facial images into one person cluster. It should be noted that the person clusters are not limited to being formed using the above-described method.

The cluster correction part 140a receives a user operation via the operation IF unit 40. In accordance with the received user operation, the cluster correction part 140a corrects the facial image cluster information set that is stored in the facial image cluster DB 23a and corresponds to the facial image whose grouping result has been corrected by the user. As a result, the operator information and the grouping time information in the corrected facial image cluster information set show "User" and the time when the above grouping correction was performed, respectively.

(Functions and Structures of Image Display Subunit)

As shown in FIG. 15, the image display subunit 200a includes a display layout control part 210a, a number determination part 220, a person cluster selection part 230 and a representative facial image selection part 250a.

The display layout control part 210a refers to contents stored in the image DB 21, the facial image DB 22 and the facial image cluster DB 23a, and controls a display layout of facial images to be displayed on the display unit 30. In controlling the display layout, the display layout control part 210a uses pieces of information input from the representative facial image selection part 250a and the operation IF unit 40.

With respect to each person cluster (representative person cluster) whose person ID has been input from the person cluster selection part 230, the representative facial image selection part 250a selects one or more representative facial images from among all the facial images included in the representative person cluster, as follows.

The representative facial image selection part 250a refers to the facial image cluster DB 23a, and acquires the number of face IDs, namely, the number of facial images, included in the representative person cluster. In a case where the person cluster facial image number input from the person cluster selection part 230 is smaller than the acquired number of facial images, the representative facial image selection part 250a determines a representative facial image number, which is the number of representative facial images to be displayed from the representative person cluster, to be the same as the person cluster facial image number. In a case where the person cluster facial image number is greater than or equal to the acquired number of facial images, the representative facial image selection part 250a determines the representative facial image number to be the same as the acquired number of facial images. In the former case, part of the facial images included in the representative person cluster becomes representative facial images. In the latter case, all of the facial images included in the representative person cluster become representative person clusters.

Next, the representative facial image selection part 250a calculates, with respect to each facial image included in the representative person cluster, likelihood indicating accuracy of the result of grouping the facial image. The representative facial image selection part 250a selects, as a first representative facial image, a facial image having the highest likelihood in the representative person cluster. The representative facial image selection part 250a selects, as a second representative facial image onward, a certain number of facial images from the representative person cluster in order of lowest likelihood, the certain number being smaller than the representative facial image number by one. Then, the representative facial image selection part 250a outputs, to the display layout control part 210a, the face ID of each representative facial image and the order in which each representative facial image is selected from the representative person cluster. This output information is used by the display layout control part 210a when displaying, from the representative unit, a representative facial image having the highest likelihood by using a display method that is different from a display method used for other representative facial images. It goes without saying that when the representative facial image number is "1", the selection of the second representative facial image onward is not performed.

Note, the representative facial image selection part 250a uses one of the following (i) and (ii) as likelihood: (i) a distance between a central position of a feature space of the representative person cluster and a position in a feature space of each facial image; and (ii) a distance between a center of mass of the feature space of the representative person cluster and the position in the feature space of each facial image. The shorter the distance, the higher the likelihood of the facial image. In other words, the longer the distance, the lower the likelihood of the facial image. The representative facial image selection part 250a (i) refers to the facial image cluster DB 23a and the facial image DB 22, (ii) calculates the central position or the center of mass of the feature space of the representative person cluster, by using pieces of facial feature amount data of facial images in the representative person cluster, and (iii) calculates, for each facial image in the representative person cluster, a position in the feature space of the facial image by using the facial feature amount data of the facial image. The representative facial image selection part 250a selects, as a first representative facial image, a facial image whose position is closest to the central position or the center of mass of the representative person cluster. The representative facial image selection part 250a selects, as a second representative facial image onward, a certain number of facial images in order of longest distance between the position of the facial image and the central position or the center of mass of the representative person cluster, the certain number being smaller than the representative facial image number by one.

According to the above structure, a facial image whose position is closest to the central position or the center of mass of the representative person cluster has the highest possibility of being accurately grouped into the representative person cluster. On the other hand, the longer the distance between the position of a facial image and the central position or the center of mass of the representative person cluster, the higher the possibility of the facial image being inaccurately grouped into the representative person cluster. Accordingly, the above structure allows the user to, for example, correct the grouping of facial images while looking at both (i) facial images that have a high possibility of being accurately grouped and (ii) facial images that have a high possibility of being inaccurately grouped. This makes it possible for the user to perform efficient annotation.

<Device Operations>

The following describes three processing performed by the representative image display device 1a shown in FIG. 17, namely, automatic grouping processing, grouping correction processing, and facial image selection/display processing.

(Operations for Automatic Grouping Processing)

FIG. 17 is a flowchart of the automatic grouping processing performed by the representative image display device 1a shown in FIG. 15.

The image input part 110 and the facial recognition processing part 120 perform processing of Steps S101 through S108, which has been explained with reference to FIG. 5.

The cluster formation part 130a refers to the facial image DB 22 and reads out, from the storage unit 20, the facial feature amount data assigned the facial feature amount file name corresponding to each face ID. Then, the cluster formation part 130a (i) groups similar facial images together by using each facial feature amount data that has been read out, (ii) forms one or more person clusters by including each group of similar facial images in a different one of the person clusters, and (iii) assigns a person ID to each person cluster formed (Step S151). Thereafter, the cluster formation part 130a stores, in correspondence with each facial image, the facial image cluster information set into the facial image cluster DB 23a (Step S152). At this time, the operator information and the grouping time information in each of the facial image cluster information sets show "System" and the time when the corresponding facial image was automatically grouped, respectively.

(Operations for Grouping Correction Processing)

FIG. 18 is a flowchart of the grouping correction processing performed by the representative image display device 1a shown in FIG. 15. By using information relating to the display layout, which is input from the display layout control part 210a, and a signal input from the operation IF unit 40, the cluster correction part 140a judges (i) a selection target, which is a target of selection made by the user (a person cluster or a facial image), and (ii) a destination to which the user has drag-and-dropped the selection target (a move destination of the selection target).

The cluster correction part 140a performs the processing of Steps S201 through 5202, which has been explained with reference to FIG. 6. The cluster correction part 140a corrects the facial image cluster information sets that are stored in the facial image cluster DB 23a and correspond to facial images included in the selected person cluster (Step S203a). Specifically, the cluster correction part 140a corrects the person ID, the operator information and the grouping time information included in each of these facial image cluster information sets to show the person ID assigned to the person cluster of the move destination, "User" and the time when the grouping of the selected person cluster was corrected, respectively.

The cluster correction part 140a performs the processing of Step S206, which has been explained with reference to FIG. 6. The cluster correction part 140a corrects the facial image cluster information set that is stored in the facial image cluster DB 23a and corresponds to the selected facial image (Step S207a). Specifically, when the move destination of the selected facial image is a person cluster, the cluster correction part 140a corrects the person ID, the operator information and the grouping time information included in this facial image cluster information set to show the person ID assigned to the person cluster of the move destination, "User" and the time when the grouping of the selected facial image was corrected, respectively. When the move destination of the selected facial image is an area where no person cluster exists, the cluster correction part 140a corrects the person ID, the operator information and the grouping time information included in this facial image cluster information set to show a person ID that has never been assigned, "User" and the time when the grouping of the selected facial image was corrected, respectively.

(Operations for Facial Image Selection/Display Processing)

FIG. 19 is a flowchart of the facial image selection/display processing performed by the representative image display device 1a shown in FIG. 15.

The number determination part 220 and the person cluster selection part 230 perform the processing of Steps S301 through S305, which has been explained with reference to FIG. 7.

The representative facial image selection part 250a refers to the facial image cluster DB 23a and acquires the number of facial images in the selected representative person cluster (Step S351). Then, the representative facial image selection part 250a (i) determines a representative facial image number N that is the number of facial images to be displayed from the representative person cluster on the display unit 30, and (ii) sets a value of a variable n to "1" (Step S352).

The representative facial image selection part 250a selects, from among all the facial images in the representative person cluster, a facial image having the highest likelihood as a first representative facial image (Step S353). At this time, the representative facial image selection part 250a outputs, to the display layout control part 210a, the face ID of the first representative facial image and the order in which the first representative facial image is selected from the representative person cluster.

The representative facial image selection part 250a increments the value of the variable n by one (Step S354), and judges whether the incremented value of the variable n is smaller than or equal to the representative facial image number N (Step S355). When the incremented value of the variable n is smaller than or equal to the representative facial image number N (the YES branch of S355), the representative facial image selection part 250a selects, from among all the facial images in the representative person cluster, a facial image having the $(n-1)^{th}$ lowest likelihood as the $n^{th}$ representative facial image (Step S356). At this time, the representative facial image selection part 250a outputs, to the display layout control part 210, the face ID of the $n^{th}$ representative facial image and the order in which the $n^{th}$ representative facial image is selected from the representative person cluster.

After performing the processing of Step S356, the representative facial image selection part 250a returns to the processing of Step S354.

The representative facial image selection part 250a performs the processing of Steps S314 through 5315, which has been explained with reference to FIG. 7.

Based on the result of executing the processing of Steps S301 through S315, the display layout control part 210a performs display control to display all the representative facial images on the display unit 30 (Step S316a). At this time, the display layout control part 210a displays borders that respectively indicate areas of all the representative person clusters. Within the border of each representative person cluster, the display layout control part 210a arranges the first to $N^{th}$ representative facial images included in the representative person cluster. Here, the first representative facial image is displayed enclosed by a thick border, and the second to $N^{th}$ representative facial images are each displayed enclosed by a thin border. The above display method enables the user to easily distinguish a representative facial image having high likelihood from a representative facial image having low likelihood.

(Example of Processing Performed by Representative Image Display Device)

With reference to FIGS. 20 to 23, the following describes one example of a sequence of processing performed by the representative image display device 1a shown in FIG. 15.

FIG. 20 schematically shows a result of automatically grouping facial images in a feature space.

In FIG. 20, facial images "ID 11" and "ID 12" are grouped into a person cluster "ID 1", and facial images "ID 21" to "ID 25" are grouped into a person cluster "ID 2".

The following description will be given under the assumption that (i) likelihoods of the facial images "ID 11" and "ID 12" included in the person cluster "ID 1" descend in this order, and (ii) likelihoods of the facial images "ID 21", "ID 22", "ID 23", "ID 24" and "ID 25" included in the person cluster "ID 2" descend in this order.

The following is an overview of facial image selection/display processing performed with respect to the grouping result schematically shown in FIG. 20. Below, it is assumed that the displayed facial image number is "4".

The person cluster selection part 230 selects the person cluster "ID 2" that includes the largest number of facial images as a representative person cluster. The representative facial image selection part 250a selects the facial images "ID 21" and "ID 25", which have the highest and lowest likelihoods in the representative person cluster "ID 2", as first and second representative facial images, respectively.

The person cluster selection part 230 selects the person cluster "ID 1" that includes the second largest number of facial images as another representative person cluster. The representative facial image selection part 250a selects the facial images "ID 11" and "ID 12", which have the highest and lowest likelihoods in the representative person cluster "ID 1", as first and second representative facial images, respectively.

Figure 21:
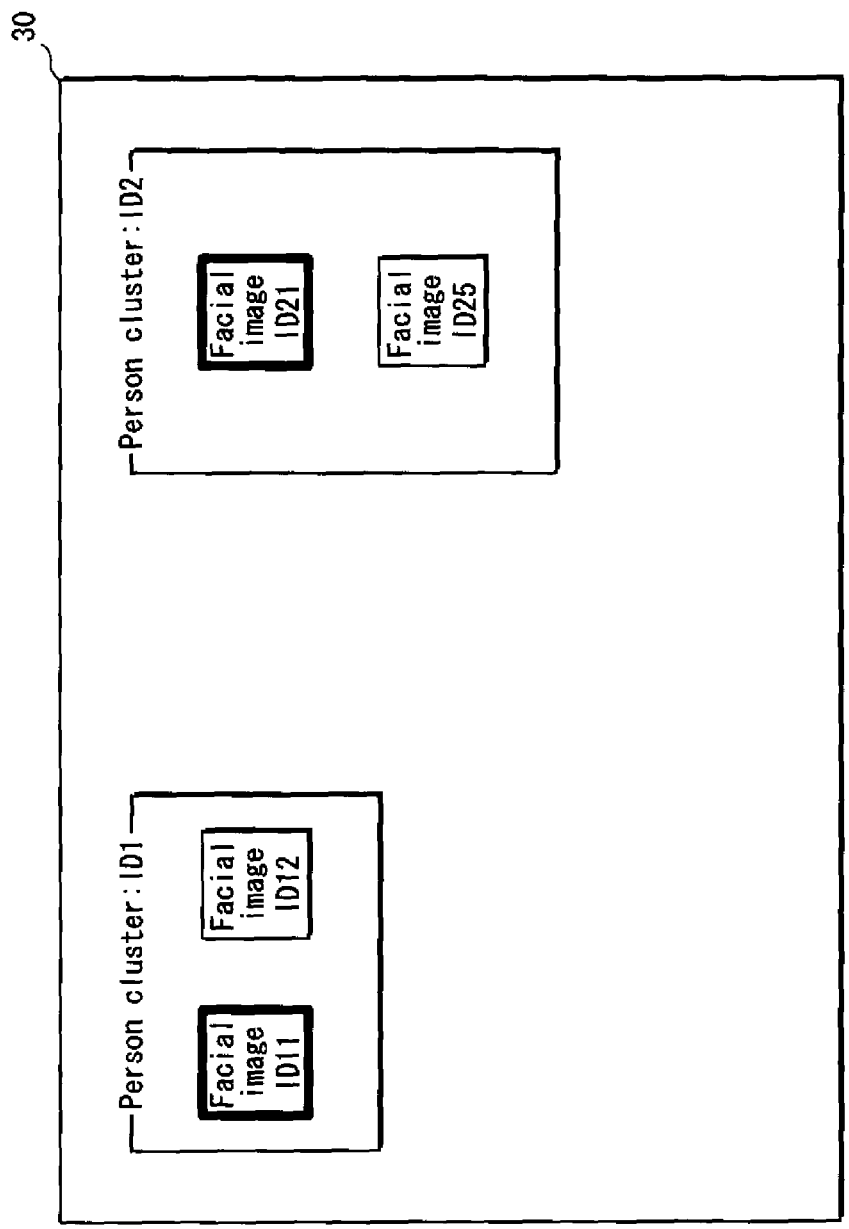
FIG. 21 shows items displayed on the display unit based on a result of the facial image selection/display processing, in order to illustrate one example of processing performed by the representative image display device shown in FIG. 15.

In accordance with the result of the above processing, the display layout control part 210a displays items shown in FIG. 21 on the display unit 30. FIG. 21 shows items displayed on the display unit 30 when the facial image selection/display processing has been performed with respect to the grouping result shown in FIG. 20.

The display layout control part 210a arranges the facial images "ID 21" and "ID 25" within the border of the person cluster "ID 2". Here, the facial image "ID 21" (the first representative facial image) is displayed enclosed by a thick border, and the other facial image is displayed enclosed by a thin border. The display layout control part 210a also arranges the facial images "ID 11" and "ID 12" within the border of the person cluster "ID 1". Here, the facial image "ID 11" (the first representative facial image) is displayed enclosed by a thick border, and the other facial image is displayed enclosed by a thin border.

Figure 22:
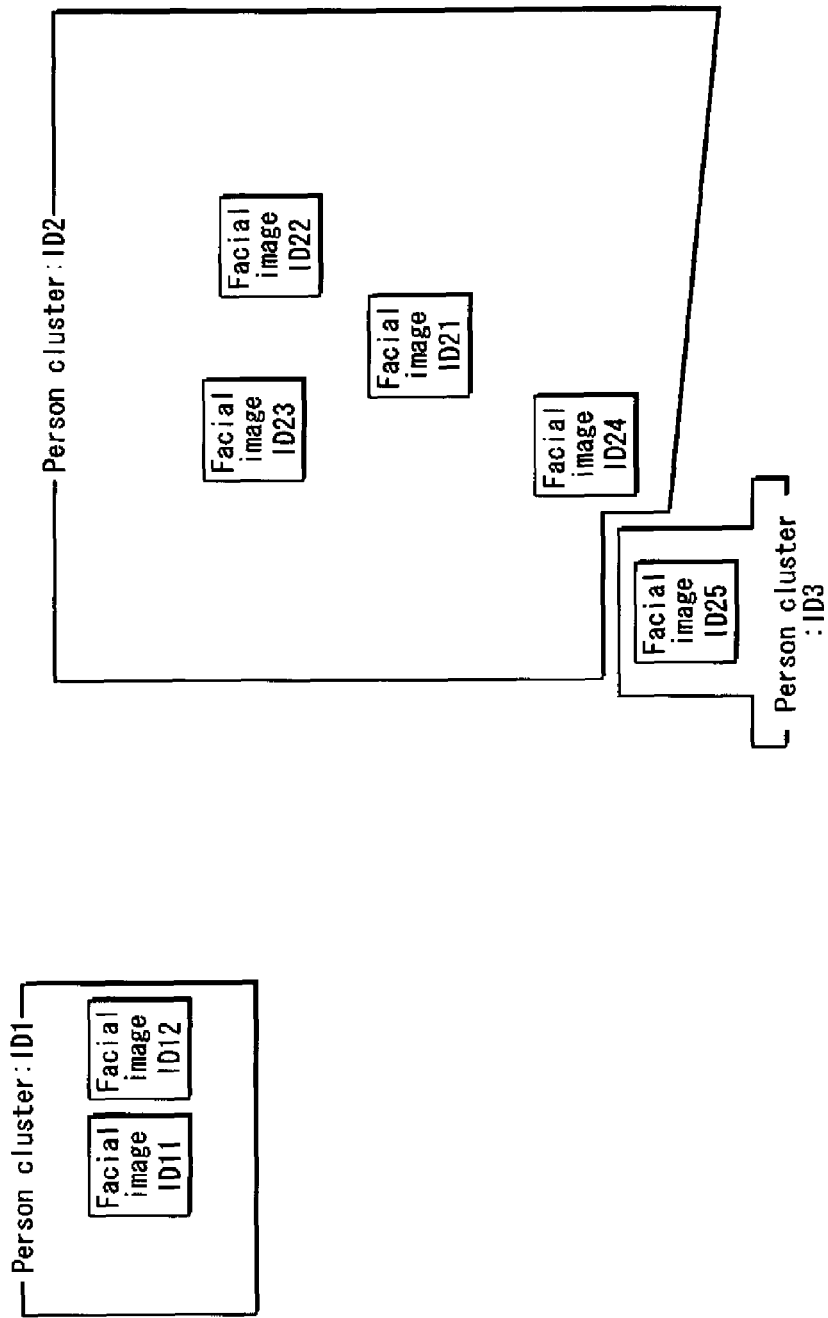
FIG. 22 schematically shows a result of facial image grouping in a feature space, in order to illustrate one example of processing performed by the representative image display device shown in FIG. 15.

Assume that while the items shown in FIG. 21 are displayed on the display unit 30, the user selects the facial image "ID 25" and drag-and-drops the facial image "ID 25" outside the borders of the person clusters "ID 1" and "ID 2". In response to this operation, the cluster correction part 140a corrects the person ID, the operator information and the grouping time information included in the facial image cluster information set corresponding to the facial image "ID 25" to show "ID 3", "User" and the time when the grouping of the facial image "ID 25" was corrected, respectively. The result of thus correcting the grouping of the facial image "ID 25" is shown in FIG. 22. FIG. 22 schematically shows the result of thus correcting the grouping of the facial image in a feature space.

In FIG. 22, the facial images "ID 11" and "ID 12" are grouped into the person cluster "ID 1", the facial images "ID 21" to "ID 24" are grouped into the person cluster "ID 2", and the facial image "ID 25" is grouped into the person cluster "ID 3".

The following description will be given under the assumption that (i) likelihoods of the facial images "ID 11" and "ID 12" in the person cluster "ID 1" descend in this order, and (ii) likelihoods of the facial images "ID 21", "ID 22", "ID 23" and "ID 24" in the person cluster "ID 2" descend in this order.

The following is an overview of facial image selection/display processing, which is performed with respect to the grouping result schematically shown in FIG. 22. Below, it is assumed that the displayed facial image number is "4".

The person cluster selection part 230 selects the person cluster "ID 2" that includes the largest number of facial images as a representative person cluster. The representative facial image selection part 250a selects the facial images "ID 21" and "ID 24", which have the highest and lowest likelihoods in the representative person cluster "ID 2", as first and second representative facial images, respectively.

The person cluster selection part 230 selects the person cluster "ID 1", which includes the second largest number of facial images, as another representative person cluster. The representative facial image selection part 250a selects the facial image "ID 11", which has the highest likelihood in the representative person cluster "ID 1", as a first representative facial image.

The person cluster selection part 230 selects the person cluster "ID 3" that includes the third largest number of facial images as yet another representative person cluster. The representative facial image selection part 250a selects the facial image "ID 25", which has the highest likelihood in the representative person cluster "ID 3", as a first representative facial image.

Figure 23:
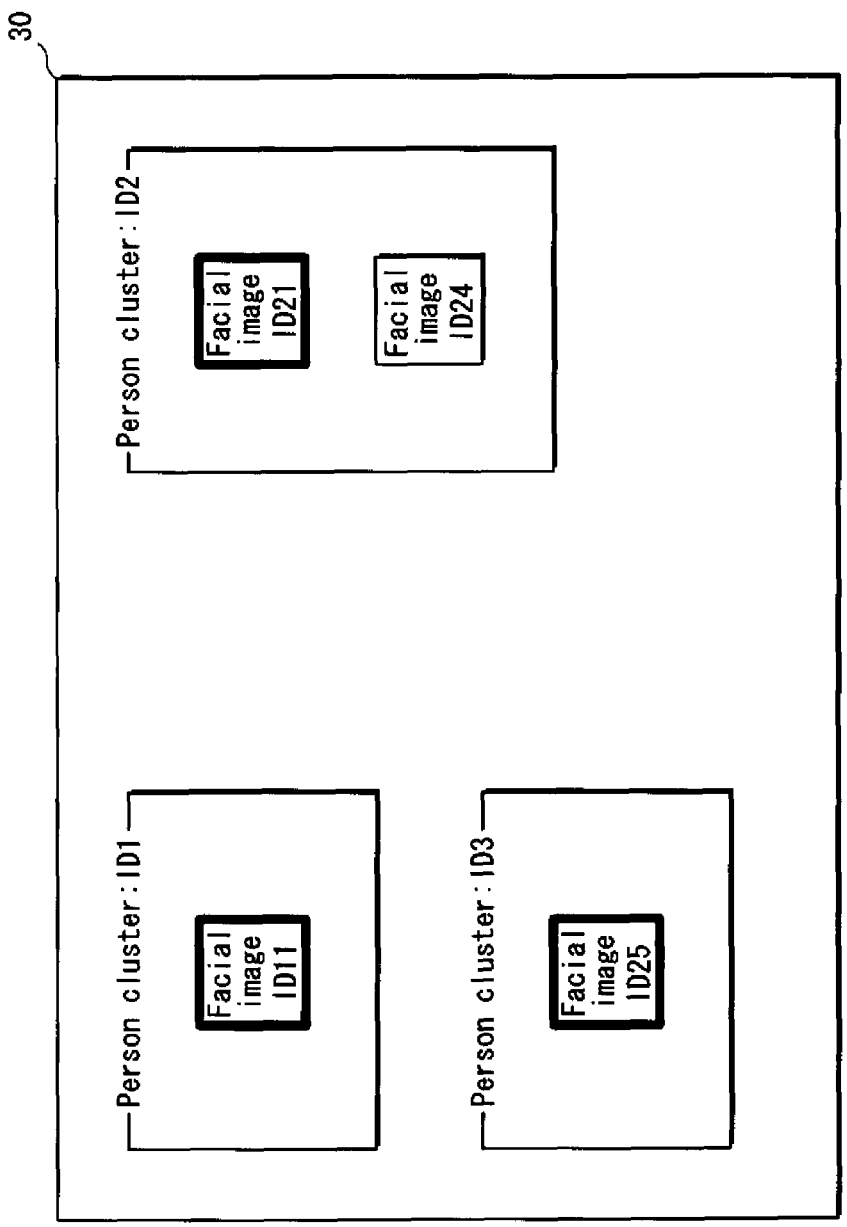
FIG. 23 shows items displayed on the display unit based on a result of the facial image selection/display processing, in order to illustrate one example of processing performed by the representative image display device shown in FIG. 15.

In accordance with the result of the above processing, the display layout control part 210a displays items shown in FIG. 23 on the display unit 30. FIG. 23 shows items displayed on the display unit 30 when the facial image selection/display processing has been performed with respect to the grouping result shown in FIG. 22.

The display layout control part 210a arranges the facial images "ID 21" and "ID 24" within the border of the person cluster "ID 2". Here, the facial image "ID 21" (the first representative facial image) is displayed enclosed by a thick border, and the other facial image is displayed enclosed by a thin border. The display layout control part 210*a* also arranges the facial image "ID 11" within the border of the person cluster "ID 1". Here, the facial image "ID 11" (the first representative facial image) is displayed enclosed by a thick border. The display layout control part 210*a* also arranges the facial image "ID 25" within the border of the person cluster "ID 3". Here, the facial image "ID 25" (the first representative facial image) is displayed enclosed by a thick border.

<<Additional Notes>>

The present invention is not limited to the above embodiments, but may be implemented in any form as long as the aims of the present invention, as well as other aims related thereto and associated therewith, can be achieved. For example, the present invention may be implemented as follows.

(1) In the above first and second embodiments, facial images of human beings are subjected to clustering. The present invention, however, is not limited to this structure. Various types of images other than facial images of human beings may be subjected to clustering by using the methods described in the first and second embodiments.

(2) In the above first and second embodiments, the person cluster selection part 230 uses the number of facial images in each person cluster as an index for selection of a representative person cluster. The present invention, however, is not limited to this structure. A representative person cluster may be selected by using, for example, the following indexes.

The person cluster selection part 230 may use, as an index for selection of a representative person cluster, the time when each person cluster is formed or corrected. In this case, a certain number of person clusters are selected as representative person clusters in order of most recent formation or correction time, the certain number being the same as the representative person cluster number. This is because a person cluster whose formation or correction time is old is considered to have already been corrected and put into a proper state by the user, whereas a person cluster whose formation or correction time is recent is considered to be still in need of correction by the user.

Alternatively, the person cluster selection part 230 may use, as an index for selection of a representative person cluster, the variance of pieces of facial feature amount data of facial images included in each person cluster. In this case, the person cluster selection part 230 (i) calculates, with respect to each person cluster, the variance of pieces of facial feature amount data of facial images included in the person cluster, by using the pieces of facial amount data of the facial images included in the person cluster, and (ii) selects a certain number of person clusters as representative person clusters in order of largest variance, the certain number being the same as the representative person cluster number. This selection method is used for the following reason. When the variance of a person cluster is large, the pieces of facial feature amount data of facial images included in the person cluster are dispersed in the feature space. Accordingly, such a person cluster is considered to have a high possibility of including inaccurate contents. On the other hand, when the variance of a person cluster is small, the pieces of facial feature amount data of facial images included in the person cluster are not dispersed in the feature space. Accordingly, such a person cluster is considered to have a low possibility of including inaccurate contents.

Alternatively, the person cluster selection part 230 may use, as an index for selection of a representative person cluster, a cluster radius of each person cluster in the feature space. In this case, the person cluster selection part 230 (i) calculates, with respect to each person cluster, a cluster radius of the person cluster, by using pieces of facial feature amount data of facial images included in the person cluster, and (ii) selects a certain number of person clusters as representative person clusters in order of largest cluster radius, the certain number being the same as the representative person cluster number. This selection method is used for the following reason. When the cluster radius of a person cluster is large, the pieces of facial feature amount data of facial images included in the person cluster are dispersed in the feature space. Accordingly, such a cluster is considered to have a high possibility of including inaccurate contents. On the other hand, when the cluster radius of a person cluster is small, the pieces of facial feature amount data of facial images included in the person cluster are not dispersed in the feature space. Accordingly, such a person cluster is considered to have a low possibility of including inaccurate contents.

Alternatively, the person cluster selection part 230 may use, as an index for selection of a representative person cluster, a position (a central position, a center of mass, etc.) in the feature space of each person cluster. In this case, the person cluster selection part 230 (i) calculates, with respect to each person cluster, a position (a central position, a center of mass, etc.) of the person cluster, by using the pieces of facial feature amount data of facial images included in the person cluster, and (ii) selects a certain number of person clusters as representative person clusters in order of shortest distance between the calculated position and a predetermined position in a feature space, the certain number being the same as the representative person cluster number. The predetermined position may be, for example, (i) a central position of an entirety of the feature spaces of all the person clusters, (ii) a center of mass of the entirety of the feature spaces of all the person clusters, and (iii) a central position or a center of mass of the feature space of a specified person cluster.

Alternatively, the person cluster selection part 230 may use, as an index for selection of a representative person cluster, a ratio of facial images whose operator information shows "System" among all the facial images in each person cluster. In this case, the person cluster selection part 230 (i) calculates, with respect to each person cluster, a ratio of facial images whose operator information shows "System" among all the facial images included in the person cluster, and (ii) selects a certain number of person clusters as representative person clusters in order of highest ratio, the certain number being the same as the representative person cluster number. This is because a person cluster including a high ratio of facial images that have not been corrected by the user is considered to be still in need of correction by the user, whereas a person cluster including a low ratio of facial images that have not been corrected by the user is considered to have already been corrected and put into a proper state by the user.

(3) In the above first embodiment, the unit selection part 240 uses, as likelihood to be considered in selecting a first representative unit, a distance between the central position or the center of mass of a feature space of a representative person cluster and the central position or the center of mass of a feature space of each unit. However, the first representative unit is not limited to being selected in this manner, but may be selected by using, for example, the following likelihoods.

The unit selection part 240 may use, as likelihood to be considered in selecting a first representative unit, the time when each unit is formed or corrected, and assume that the older the formation or correction time of a unit, the higher the likelihood of the unit. In this case, the unit selection part 240 selects, as the first representative unit, a unit whose formation or correction time is the oldest. This is because a unit whose formation or correction time is old is considered to have an accurate grouping result and to require no further correction by the user.

Alternatively, the unit selection part 240 may use, as likelihood to be considered in selecting a first representative unit, the number of facial images included in each unit, and assume that the smaller the number of facial images included in a unit, the higher the likelihood of the unit. In this case, the unit selection part 240 selects, as the first representative unit, a unit including the smallest number of facial images. This is because a unit including a small number of facial images is considered to have a low possibility of including inaccurate facial images.

Alternatively, the unit selection part 240 may use, as likelihood to be considered in selecting a first representative unit, a cluster radius of each unit in the feature space, and assume that the smaller the cluster radius of a unit, the higher the likelihood of the unit. In this case, the unit selection part 240 (i) calculates, with respect to each unit included in the representative person cluster, a cluster radius of the unit in the feature space, by using the pieces of facial feature amount data of facial images included in the unit, and (ii) selects a unit having the smallest cluster radius as the first representative unit. This is because a unit having a small cluster radius is considered to have a low possibility of including inaccurate facial images.

Alternatively, the unit selection part 240 may (i) use, as likelihood to be considered in selecting a first representative unit, density of pieces of facial feature amount data of facial images in the feature space, the facial images being included in each unit, and (ii) assume that the higher the density, the higher the likelihood of the unit. In this case, the unit selection part 240 (i) calculates, with respect to each unit included in the representative person cluster, density pertaining to the unit in the feature space, by using the pieces of facial feature amount data of the facial images included in the unit, and (ii) selects a unit having the highest density as the first representative unit. This selection method is used for the following reason. When the density of a unit is high, the pieces of facial feature amount data of the facial images included in the unit are concentrated in the feature space. Accordingly, such a unit is considered to have a low possibility of including inaccurate facial images.

Alternatively, the unit selection part 240 may (i) use, as likelihood to be considered in selecting a first representative unit, the variance pertaining to facial images in the feature space, the facial images being included in each unit, and (ii) assume that the smaller the variance, the higher the likelihood of the unit. In this case, the unit selection part 240 (i) calculates, with respect to each unit included in the representative person cluster, the variance of pieces of facial feature amount data of facial images included in the unit, by using the pieces of facial feature amount data of the facial images included in the unit, and (ii) selects a unit having the smallest variance as a representative unit. This selection method is used for the following reason. When the variance of a unit is small, the pieces of facial feature amount data of the facial images included in the unit are concentrated in the feature space. Accordingly, such a unit is considered to have a low possibility of including inaccurate facial images.

Alternatively, the unit selection part 240 may (i) use, as likelihood to be considered in selecting a first representative unit, a ratio of facial images whose operator information shows "User" among all the facial images in each unit, and (ii) assume that the higher the ratio, the higher the likelihood of the unit. In this case, the unit selection part 240 (i) calculates, with respect to each unit in the representative person cluster, a ratio of facial images whose operator information shows "User" among all the facial images included in the unit, and (ii) selects a unit having the highest ratio as the first representative unit. This is because a unit including a high ratio of facial images that have been corrected by the user is considered to require no further correction by the user.

(4) In the above first embodiment, the unit selection part 240 uses, as likelihood to be considered in selecting a second representative unit onward, a distance between the central position or the center of mass of a feature space of a representative person cluster and the central position or the center of mass of a feature space of each unit. However, the second representative unit onward are not limited to being selected in this manner, but may be selected by using, for example, the following likelihoods.

The unit selection part 240 may use, as likelihood to be considered in selecting a second representative unit onward, the time when each unit is formed or corrected, and assume that the more recent the formation or correction time of a unit, the lower the likelihood of the unit. In this case, the unit selection part 240 selects a certain number of units as representative units in order of most recent formation or correction time, the certain number being smaller than the representative unit number by one. This is because a unit whose formation or correction time is recent is considered to be still in need of further correction by the user.

Alternatively, the unit selection part 240 may use, as likelihood to be considered in selecting a second representative unit onward, the number of facial images included in each unit, and assume that the larger the number of facial images included in a unit, the lower the likelihood of the unit. In this case, the unit selection part 240 selects a certain number of units as representative units in order of largest number of facial images included therein, the certain number being smaller than the representative unit number by one. This is because a unit including a large number of facial images is considered to have a high possibility of including inaccurate facial images.

Alternatively, the unit selection part 240 may use, as likelihood to be considered in selecting a second representative unit onward, a cluster radius of each unit in the feature space, and assume that the larger the cluster radius of a unit, the lower the likelihood of the unit. In this case, the unit selection part 240 (i) calculates, with respect to each unit included in the representative person cluster, a cluster radius of the unit in the feature space, by using pieces of facial feature amount data of facial images included in the unit, and (ii) selects a certain number of units as representative units in order of largest cluster radius, the certain number being smaller than the representative unit number by one. This selection method is used for the following reason. When the cluster radius of a unit is large, the pieces of facial feature amount data of facial images included in the unit are dispersed in the feature space. Accordingly, such a unit is considered to have a high possibility of including inaccurate facial images.

Alternatively, the unit selection part 240 may (i) use, as likelihood to be considered in selecting a second representative unit onward, density of pieces of facial feature amount data of facial images in the feature space, the facial images being included in each unit, and (ii) assume that the lower the density, the lower the likelihood of the unit. In this case, the unit selection part 240 (i) calculates, with respect to each unit included in the representative person cluster, density pertaining to the unit in the feature space, by using the pieces of facial feature amount data of the facial images included in the unit, and (ii) selects a certain number of units as representative units in order of lowest density, the certain number being smaller than the representative unit number by one. This selection method is used for the following reason. When the density of a unit is low, the pieces of facial feature amount data of the facial images included in the unit are dispersed in the feature space. Accordingly, such a unit is considered to have a high possibility of including inaccurate facial images.

Alternatively, the unit selection part 240 may (i) use, as likelihood to be considered in selecting a second representative unit onward, the variance pertaining to facial images in the feature space, the facial images being included in each unit, and (ii) assume that the larger the variance, the lower the likelihood of the unit. In this case, the unit selection part 240 (i) calculates, with respect to each unit included in the representative person cluster, the variance of pieces of facial feature amount data of facial images included in the unit, by using the pieces of facial feature amount data of the facial images included in the unit, and (ii) selects a certain number of units as representative units in order of largest variance, the certain number being smaller than the representative unit number by one. This selection method is used for the following reason. When the variance of a unit is large, the pieces of facial feature amount data of the facial images included in the unit are dispersed in the feature space. Accordingly, such a unit is considered to have a high possibility of including inaccurate facial images.

Alternatively, the unit selection part 240 may (i) use, as likelihood to be considered in selecting a second representative unit onward, a ratio of facial images whose operator information shows "System" among all the facial images in each unit, and (ii) assume that the higher the ratio, the lower the likelihood of the unit. In this case, the unit selection part 240 (i) calculates, with respect to each unit in the representative person cluster, a ratio of facial images whose operator information shows "System" among all the facial images included in the unit, and (ii) selects a certain number of units as representative units in order of highest ratio, the certain number being smaller than the representative unit number by one. This is because a unit including a high ratio of facial images that have not been corrected by the user is considered to require further correction by the user.

(5) In the above first and second embodiments, the representative facial image selection part 250 or 250a uses, as likelihood to be considered in selecting a first representative facial image, a distance between the central position or the center of mass of a feature space of a representative unit or a representative person cluster and a position in a feature space of each facial image. However, the first representative facial image is not limited to being selected in this manner, but may be selected by using, for example, the following likelihoods.

The representative facial image selection part 250 or 250a may use, as likelihood to be considered in selecting a first representative facial image, the time when each facial image is grouped (i.e., the time when each facial image is automatically grouped, or the time when the grouping of each facial image is corrected), and assume that the older the grouping time of a facial image, the higher the likelihood of the facial image. In this case, the representative facial image selection part 250 or 250a selects a facial image whose grouping time is the oldest as the first representative facial image. This is because a facial image whose grouping time is old is considered to have an accurate grouping result and to require no further correction by the user.

Alternatively, the representative facial image selection part 250 or 250a may use, as likelihood to be considered in selecting a first representative facial image, the operator information of each facial image, and assume that a facial image whose operator information shows "User" has high likelihood. The representative facial image selection part 250 or 250a preferentially selects a facial image whose operator information shows "User" as the first representative facial image.

Alternatively, the representative facial image selection part 250 may (i) use, as likelihood to be considered in selecting a first representative facial image, a distance between (a) the central position or the center of mass of a feature space of the representative person cluster to which the representative unit belongs, and (b) a position in a feature space of each facial image, and (ii) assume that the shorter the distance, the higher the likelihood of the facial image. In this case, the representative facial image selection part 250 calculates (i) the central position or the center of mass of the feature space of the representative person cluster to which the representative unit belongs, by using pieces of facial feature amount data of facial images included in the representative person cluster, and (ii) a position in the feature space of each facial image included in the representative unit, by using pieces of facial feature amount data of the facial images included in the representative unit. The representative facial image selection part 250 selects, as the first representative facial image, a facial image whose position is closest to the central position or the center of mass of the representative person cluster.

(6) In the above first and second embodiments, the representative facial image selection part 250 or 250a uses, as likelihood to be considered in selecting a second representative facial image onward, a distance between the central position or the center of mass of a feature space of a representative unit or a representative person cluster and a position in a feature space of each facial image. However, the second representative facial image onward are not limited to being selected in this manner, but may be selected by using, for example, the following likelihoods.

The representative facial image selection part 250 or 250a may use, as likelihood to be considered in selecting a second representative facial image onward, the time when each facial image is grouped (i.e., the time when each facial image is automatically grouped, or the time when the grouping of each facial image is corrected), and assume that the more recent the grouping time of a facial image, the lower the likelihood of the facial image. In this case, the representative facial image selection part 250 or 250a selects a certain number of facial images as representative facial images in order of most recent grouping time, the certain number being smaller than the representative facial image number by one. This is because a facial image whose grouping time is recent is considered to be still in need of further correction by the user.

Alternatively, the representative facial image selection part 250 or 250a may use, as likelihood to be considered in selecting a second representative facial image onward, the operator information of each facial image, and assume that a facial image whose operator information shows "System" has low likelihood. The representative facial image selection part 250 or 250a preferentially selects a certain number of facial images whose operator information shows "System" as representative facial images, the certain number being smaller than the representative facial image number by one.

Alternatively, the representative facial image selection part 250 may (i) use, as likelihood to be considered in selecting a second representative facial image onward, a distance between (a) the central position or the center of mass of the feature space of the representative person cluster to which the representative unit belongs, and (b) a position in the feature space of each facial image, and (ii) assume that the longer the distance, the lower the likelihood of the facial image. In this case, the representative facial image selection part 250 calculates (i) the central position or the center of mass of the feature space of the representative person cluster to which the representative unit belongs, by using pieces of facial feature amount data of facial images included in the representative person cluster, and (ii) a position in the feature space of each facial image included in the representative unit, by using pieces of facial feature amount data of the facial images included in the representative unit. The representative facial image selection part 250 selects a certain number of facial images as representative facial images in order of the longest distance between the central position or the center of mass of the representative person cluster and the position of the facial image, the certain number being smaller than the representative facial image by one.

(7) In the above first and second embodiments, the unit selection part 240 may select representative units so that the representative units are evenly dispersed in a facial feature space, and the representative facial image selection part 250 or 250*a* may select representative facial images so that the representative facial images are evenly dispersed in the facial feature space.

(8) In the above first embodiment, the display layout control part 250 displays the first representative unit by using a display method that is different from a display method used for other representative units, namely, by making the thickness of the border of the first representative unit different from the thickness of the borders of other representative units. However, the representative units are not limited to being displayed in this manner. The display layout control part 250 may display the first representative unit and other representative units using any display method, as long as the first representative unit and other representative units are displayed using different display methods in such a way that the user can distinguish between the first representative unit and other representative units. For example, the display layout control part 250 may (i) change the color with which the first representative unit is displayed from the color with which other representative units are displayed, (ii) change the size in which the first representative unit is displayed from the size in which other representative units are displayed, (iii) display an icon superimposed on the first representative unit, so as to explicitly indicate that the unit on which the icon is superimposed is the first representative unit, and so on.

In the above first and second embodiments, the display layout control part 250 or 250*a* displays the first representative facial image by using a display method that is different from a display method used for other representative facial images, namely, by making the thickness of the border of the first representative facial image different from the thickness of the borders of other representative facial images. However, the representative facial images are not limited to being displayed in this manner. The display layout control part 250 or 250*a* may display the first representative facial image and other representative facial images using any display method, as long as the first representative facial image and other representative facial images are displayed using different display methods in such a way that the user can distinguish between the first representative facial image and other representative facial images. For example, the display layout control part 250 or 250*a* may (i) change the color with which the first representative facial image is displayed from the color with which other representative facial images are displayed, (ii) change the size in which the first representative facial image is displayed from the size in which other representative facial images are displayed, (iii) display an icon superimposed on the first representative facial image, so as to explicitly indicate that the facial image on which the icon is superimposed is the first representative facial image, and so on.

(9) In the above first embodiment, the display layout control part 250 displays the result of the facial image selection/display processing by using, as one example, the display method shown in FIG. 10. However, the display layout control part 250 is not limited to using this display method. For instance, the display layout control part 250 may display the result of the facial image selection/display processing by using a display method shown in FIG. 24. In this case, by way of example, the first to $M^{th}$ representative units are arranged in a representative person cluster in order, from top down. In each representative unit, the first to $N^{th}$ representative facial images are arranged in order, from top down. The open rows in FIG. 24 are used when creating a person cluster of a new person, or a new unit.

Figure 24:
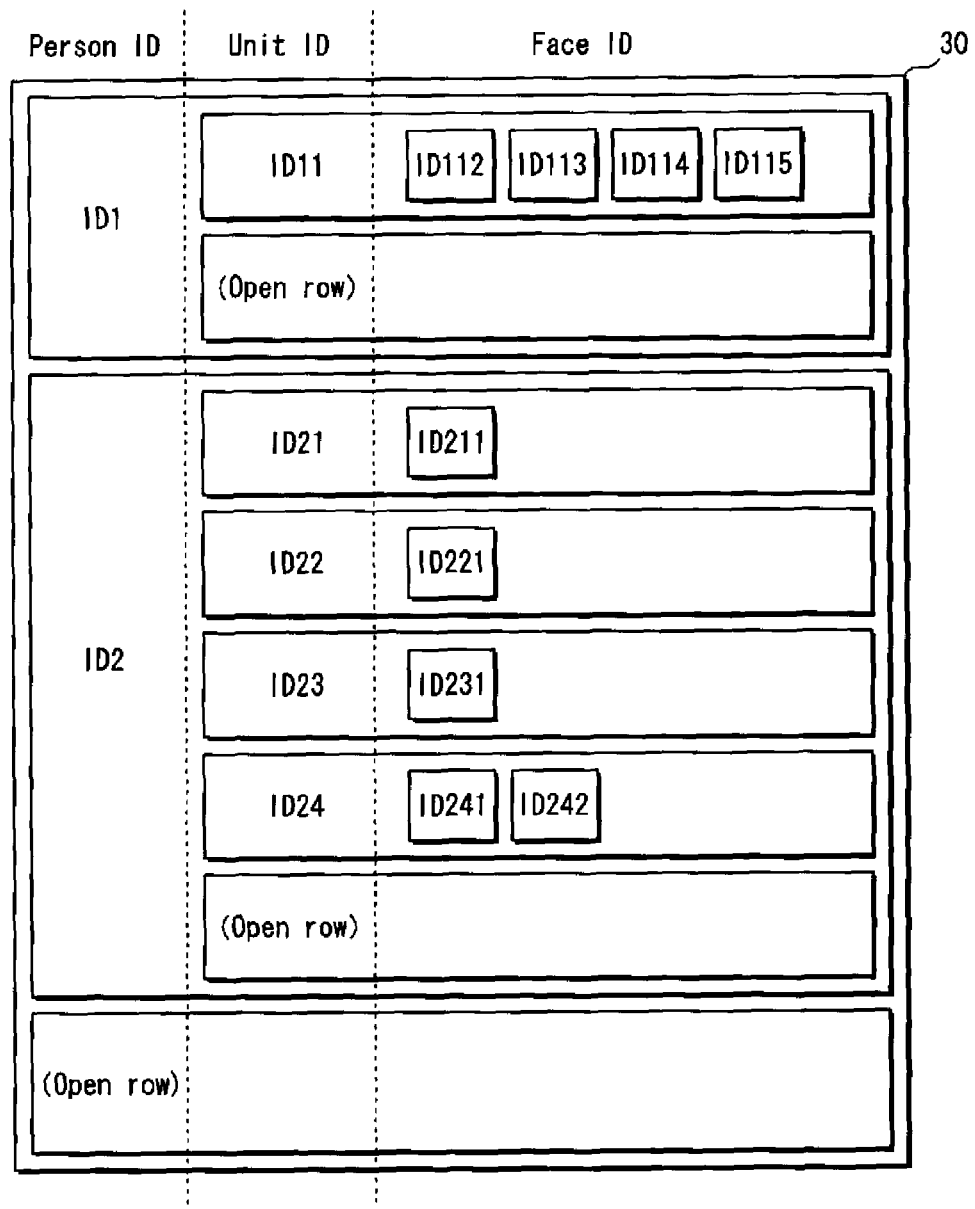
FIG. 24 shows another display method with which the display unit displays items based on a result of the facial image selection/display processing.

In order to correct a grouping result when the display method of FIG. 24 is used, the user should select a person cluster, a unit or a facial image to be corrected, and drag-and-drop the selected item to a person cluster or a unit (including the open rows) of a move destination. For example, when the user wants to group the facial images included in the unit "ID 24" into a person cluster of a different person, the user selects the unit "ID 24" and drag-and-drops the selected unit "ID 24" inside the border of the "Open row" of a different person cluster.

The above display method may be applied to the second embodiment with modification.

(10) The representative image display device 1 (1*a*) of the above first and second embodiments may be modified so that it can switch between the following display methods: (i) in a case where the user performs annotation, select and display representative facial images in the same manner as in the first and second embodiments; and (ii) in a case where the user merely browses the images, select and display representative facial images in a different manner from the first and second embodiments. By way of example, in the case where the user merely browses the images, the representative image display device performs the following operations: (i) select, from a representative person cluster, units as representative units in order of highest likelihood; (ii) select, from a representative unit or a representative person cluster, facial images as representative facial images in order of highest likelihood. This makes it easy for the user to grasp to which people the representative person clusters and the representative units relate.

(11) In the above first and second embodiments, the person cluster selection part 230 determines the person cluster facial image number, which is the number of representative facial images displayed from each representative person cluster, so that each representative person cluster has a similar person cluster facial image number. However, the person cluster facial image number is not limited to being determined in the above manner, but may be determined, for example, in the following manners.

In the first embodiment, the person cluster selection part 230 may determine the person cluster facial image number in consideration of the number of units included in each representative person cluster, in such a manner that the larger the number of units in a representative person cluster, the larger the number of representative facial images displayed from the representative person cluster (i.e., the person cluster facial image number).

In the first and second embodiments, the person cluster selection part 230 may determine the person cluster facial image number in consideration of the number of facial images included in each representative person cluster, in such a manner that the larger the number of facial images in a representative person cluster, the larger the number of representative facial images displayed from the representative person cluster (the person cluster facial image number).

(12) In the above first embodiment, the unit selection part 240 determines the unit facial image number, which is the number of representative facial images displayed from each representative unit, so that each representative unit has a similar unit facial image number. However, the unit facial image number is not limited to being determined in the above manner, but may be determined, for example, in the following manner. The unit selection part 240 may determine the unit facial image number in consideration of the number of facial images in each representative unit, in such a manner that the larger the number of facial images in a representative unit, the larger the number of representative facial images displayed from the representative unit (the unit facial image number).

(13) The devices pertaining to the above embodiments are not limited to being realized with a software structure operated by CPU or MPU, but may be realized with, for example, a hardware structure. In this case, the devices are typically realized as a large scale integration (LSI), which is an integrated circuit. Compositional units of the devices may each be manufactured integrated on one chip. Alternatively, a part or all of the compositional units of the devices may be manufactured integrated on one chip. Here, LSI may be IC, a system LSI, a super LSI or an ultra LSI, depending on the degree of integration. Furthermore, the integration of circuits is not limited to being realized with LSI, but may be realized with a special-purpose circuit or a general-use processor. Alternatively, the integration may be realized with use of a field programmable gate array (FPGA) that is programmable after manufacturing of LSI, or a reconfigurable processor that enables reconfiguration of the connection and settings of circuit cells in LSI. Furthermore, if new technology for an integrated circuit that replaces LSIs appears due to advances in or derivations from semiconductor technology, such new technology may be used for integration of the functional blocks. Bio-technology is one possible application.

The present invention can be beneficially used for a representative image display device that displays a result of image clustering.

[Reference Signs List]
    1 representative image display device
    10, 10a calculation processing unit
    20, 20a storage unit
    21 image database (image DB)
    22 facial image database (facial image DB)
    23, 23a facial image cluster database (facial image cluster DB)
    30 display unit
    40 operation interface unit (operation IF unit)
    100 image analysis subunit
    110 image input part
    120 facial recognition processing part
    130, 130a cluster formation part
    140, 140a cluster correction part
    200 image display subunit
    210 display layout control part
    220 number determination part
    230 person cluster selection part
    240 unit selection part
    250, 250a representative facial image selection part

The invention claimed is:

1. A representative image display device that selects representative images according to grouping results of a plurality of images and sub-clusters and displays the selected representative images on a display, the images being grouped into the sub-clusters such that each sub-cluster includes similar images, the sub-clusters being grouped into a plurality of clusters such that each cluster includes similar sub-clusters, the representative image display device comprising:
    a cluster selection unit operable to select one or more of the clusters as representative clusters;
    a sub-cluster selection unit operable to select, from each representative cluster, M sub-clusters as representative sub-clusters based on first likelihoods of the sub-clusters in the representative cluster, each first likelihood indicating accuracy of the grouping result of the corresponding sub-cluster (M is an integer satisfying a relationship $1 \leq M \leq$ the number of the sub-clusters in the representative cluster); and
    a representative image selection unit operable to select, from each representative sub-cluster, N images as representative images based on second likelihoods of the images in the representative sub-cluster, each second likelihood indicating accuracy of the grouping result of the corresponding image (N is an integer satisfying a relationship $1 \leq N \leq$ the number of the images in the representative sub-cluster),
    wherein the sub-cluster selection unit (i) selects, from each representative cluster, the sub-cluster having a highest first likelihood in the representative cluster as a first representative sub-cluster, and (ii) when M is greater than or equal to 2, further selects, from each representative cluster, (M−1) sub-clusters as second to $M^{th}$ representative sub-clusters in order of a lowest first likelihood, and wherein
    the sub-cluster selection unit uses, as the first likelihood of each sub-cluster, a distance between (i) a central position or a center of mass of a feature space of the corresponding representative cluster and (ii) a central position or a center of mass of a feature space of the sub-cluster.

2. The representative image display device of claim 1 further comprising
    a number determination unit operable to determine the number of representative images to be displayed on the display, according to a size of a display area of the display and an image size that can be visually recognized by a user.

3. A representative image display device that selects representative images according to grouping results of a plurality of images and sub-clusters and displays the selected representative images on a display, the images being grouped into the sub-clusters such that each sub-cluster includes similar images, the sub-clusters being grouped into a plurality of clusters such that each cluster includes similar sub-clusters, the representative image display device comprising:
    a cluster selection unit operable to select one or more of the clusters as representative clusters;
    a sub-cluster selection unit operable to select, from each representative cluster, M sub-clusters as representative sub-clusters based on first likelihoods of the sub-clusters in the representative cluster, each first likelihood indicating accuracy of the grouping result of the corresponding sub-cluster (M is an integer satisfying a relationship $1 \leq M \leq$ the number of the sub-clusters in the representative cluster); and
    a representative image selection unit operable to select, from each representative sub-cluster, N images as representative images based on second likelihoods of the images in the representative sub-cluster, each second likelihood indicating accuracy of the grouping result of the corresponding image (N is an integer satisfying a relationship 1≤N≤the number of the images in the representative sub-cluster), wherein the sub-cluster selection unit (i) selects, from each representative cluster, the sub-cluster having a highest first likelihood in the representative cluster as a first representative sub-cluster, and (ii) when M is greater than or equal to 2, further selects, from each representative cluster, (M−1) sub-clusters as second to $M^{th}$ representative sub-clusters in order of a lowest first likelihood, and wherein when selecting the first representative sub-cluster, the sub-cluster selection unit uses, as the first likelihood of each sub-cluster, a distance between (i) a central position or a center of mass of a feature space of the corresponding representative cluster and (ii) a central position or a center of mass of a feature space of the sub-cluster, and when selecting the second to $M^{th}$ representative sub-clusters, the sub-cluster selection unit uses, as the first likelihood of each sub-cluster, information showing whether the grouping result of the sub-cluster has been corrected by a user.

4. The representative image display device of claim 1, wherein each image is a facial image of a human being.

5. A representative image display device that selects representative images according to grouping results of a plurality of images and sub-clusters and displays the selected representative images on a display, the images being grouped into the sub-clusters such that each sub-cluster includes similar images, the sub-clusters being grouped into a plurality of clusters such that each cluster includes similar sub-clusters, the representative image display device comprising:

a cluster selection unit operable to select one or more of the clusters as representative clusters;

a sub-cluster selection unit operable to select, from each representative cluster, M sub-clusters as representative sub-clusters based on first likelihoods of the sub-clusters in the representative cluster, each first likelihood indicating accuracy of the grouping result of the corresponding sub-cluster (M is an integer satisfying a relationship 1≤M≤the number of the sub-clusters in the representative cluster); and a representative image selection unit operable to select, from each representative sub-cluster, N images as representative images based on second likelihoods of the images in the representative sub-cluster, each second likelihood indicating accuracy of the grouping result of the corresponding image (N is an integer satisfying a relationship 1≤N≤the number of the images in the representative sub-cluster), wherein the sub-cluster selection unit (i) selects, from each representative cluster, the sub-cluster having a highest first likelihood in the representative cluster as a first representative sub-cluster, and (ii) when M is greater than or equal to 2, further selects, from each representative cluster, (M−1) sub-clusters as second to $M^{th}$ representative sub-clusters in order of a lowest first likelihood, the representative image selection unit (i) selects, from each representative sub-cluster, the image having the highest second likelihood in the representative sub-cluster as a first representative image, and (ii) when N is greater than or equal to 2, further selects, from each representative sub-cluster, (N−1) images as second to $N^{th}$ representative images in order of the lowest second likelihood, and wherein when selecting the first representative image, the representative image selection unit uses, as the second likelihood of each image, a distance between (i) a central position or a center of mass of a feature space of the corresponding representative sub-cluster and (ii) a position in a feature space of the image, and when selecting the second to $N^{th}$ representative images, the representative image selection unit uses, as the second likelihood of each image, information showing whether the grouping result of the image has been corrected by a user.

6. The representative image display device of Claim 5 further comprising a display layout control unit operable to display the first representative image by using a display method that is different from a display method used for the second to $N^{th}$ representative images.

7. A representative image display method for selecting representative images according to grouping results of a plurality of images and sub-clusters and displaying the selected representative images on a display, the images being grouped into the sub-clusters such that each sub-cluster includes similar images, the sub-clusters being grouped into a plurality of clusters such that each cluster includes similar sub-clusters, the representative image display method comprising:

a cluster selection step for selecting one or more of the clusters as representative clusters;

a sub-cluster selection step for selecting, from each representative cluster, M sub-clusters as representative sub-clusters based on first likelihoods of the sub-clusters in the representative cluster, each first likelihood indicating accuracy of the grouping result of the corresponding sub-cluster (M is an integer satisfying a relationship 1≤M≤the number of the sub-clusters in the representative cluster); and a representative image selection step for selecting, from each representative sub-cluster, N images as representative images based on second likelihoods of the images in the representative sub-cluster, each second likelihood indicating accuracy of the grouping result of the corresponding image (N is an integer satisfying a relationship 1≤N≤the number of the images in the representative sub-cluster), wherein the sub-cluster selection unit (i) selects, from each representative cluster, the sub-cluster having a highest first likelihood in the representative cluster as a first representative sub-cluster, and (ii) when M is greater than or equal to 2, further selects, from each representative cluster, (M−1) sub-clusters as second to $M^{th}$ representative sub-clusters in order of a lowest first likelihood, wherein the sub-cluster selection step uses, as the first likelihood of each sub-cluster, a distance between (i) a central position or a center of mass of a feature space of the corresponding representative cluster and (ii) a central position or a center of mass of a feature space of the sub-cluster.

8. A representative image display method for selecting representative images according to grouping results of a plurality of images and sub-clusters and displaying the selected representative images on a display, the images being grouped into the sub-clusters such that each sub-cluster includes similar images, the sub-clusters being grouped into a plurality of clusters such that each cluster includes similar sub-clusters, the representative image display method comprising:

a cluster selection step for selecting one or more of the clusters as representative clusters;

a sub-cluster selection step for selecting, from each representative cluster, M sub-clusters as representative sub-clusters based on first likelihoods of the sub-clusters in the representative cluster, each first likelihood indicating accuracy of the grouping result of the corresponding sub-cluster (M is an integer satisfying a relationship 1≤M≤the number of the sub-clusters in the representative cluster); and a representative image selection step for selecting, from each representative sub-cluster, N images as representative images based on second likelihoods of the images in the representative sub-cluster, each second likelihood indicating accuracy of the grouping result of the corresponding image (N is an integer satisfying a relationship 1≤N≤the number of the images in the representative sub-cluster), wherein the sub-cluster selection step (i) selects, from each representative cluster, the sub-cluster having a highest first likelihood in the representative cluster as a first representative sub-cluster, and (ii) when M is greater than or equal to 2, further selects, from each representative cluster, (M−1) sub-clusters as second to $M^{th}$ representative sub-clusters in order of a lowest first likelihood, and wherein when selecting the first representative sub-cluster, the sub-cluster selection step uses, as the first likelihood of each sub-cluster, a distance between (i) a central position or a center of mass of a feature space of the corresponding representative cluster and (ii) a central position or a center of mass of a feature space of the sub-cluster, and when selecting the second to $M^{th}$ representative sub-clusters, the sub-cluster selection step uses, as the first likelihood of each sub-cluster, information showing whether the grouping result of the sub-cluster has been corrected by a user.

9. A representative image display method for selecting representative images according to grouping results of a plurality of images and sub-clusters and displaying the selected representative images on a display, the images being grouped into the sub-clusters such that each sub-cluster includes similar images, the sub-clusters being grouped into a plurality of clusters such that each cluster includes similar sub-clusters, the representative image display method comprising:

a cluster selection step of selecting one or more of the clusters as representative clusters;

a sub-cluster selection step of selecting, from each representative cluster, M sub-clusters as representative sub-clusters based on first likelihoods of the sub-clusters in the representative cluster, each first likelihood indicating accuracy of the grouping result of the corresponding sub-cluster (M is an integer satisfying a relationship 1≤M≤the number of the sub-clusters in the representative cluster); and a representative image selection step of selecting, from each representative sub-cluster, N images as representative images based on second likelihoods of the images in the representative sub-cluster, each second likelihood indicating accuracy of the grouping result of the corresponding image (N is an integer satisfying a relationship 1≤N≤the number of the images in the representative sub-cluster), wherein the sub-cluster selection step (i) selects, from each representative cluster, the sub-cluster having a highest first likelihood in the representative cluster as a first representative sub-cluster, and (ii) when M is greater than or equal to 2, further selects, from each representative cluster, (M−1) sub-clusters as second to $M^{th}$ representative sub- clusters in order of a lowest first likelihood, the representative image selection step (i) selects, from each representative sub-cluster, the image having the highest second likelihood in the representative sub-cluster as a first representative image, and (ii) when N is greater than or equal to 2, further selects, from each representative sub-cluster, (N−1) images as second to $N^{th}$ representative images in order of the lowest second likelihood, and wherein when selecting the first representative image, the representative image selection step uses, as the second likelihood of each image, a distance between (i) a central position or a center of mass of a feature space of the corresponding representative sub-cluster and (ii) a position in a feature space of the image, and when selecting the second to $N^{th}$ representative images, the representative image selection unit uses, as the second likelihood of each image, information showing whether the grouping result of the image has been corrected by a user.

* * * * *